(12) United States Patent
Ito

(10) Patent No.: US 10,532,392 B2
(45) Date of Patent: Jan. 14, 2020

(54) WORKPIECE CONVEYING APPARATUS FOR A PRESSING MACHINE

(71) Applicant: AIDA ENGINEERING, LTD., Sagamihara-shi, Kanagawa (JP)

(72) Inventor: Takao Ito, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 373 days.

(21) Appl. No.: 15/373,272

(22) Filed: Dec. 8, 2016

(65) Prior Publication Data

US 2017/0165738 A1 Jun. 15, 2017

(30) Foreign Application Priority Data

Dec. 10, 2015 (JP) ................................. 2015-241068

(51) Int. Cl.
| | | |
|---|---|---|
| *B21D 43/05* | (2006.01) | |
| *B65G 47/90* | (2006.01) | |
| *B65G 47/96* | (2006.01) | |
| *B21D 43/18* | (2006.01) | |
| *B65G 47/91* | (2006.01) | |
| *B65G 54/02* | (2006.01) | |

(52) U.S. Cl.
CPC ........... *B21D 43/05* (2013.01); *B21D 43/052* (2013.01); *B21D 43/055* (2013.01); *B21D 43/18* (2013.01);
(Continued)

(58) Field of Classification Search
CPC ............................. B21D 43/02; B21D 43/027
See application file for complete search history.

(56) References Cited

U.S. PATENT DOCUMENTS

| 1,681,012 A | * | 8/1928 | Rode ..................... B21D 43/05 72/344 |
| 6,126,582 A | * | 10/2000 | Dangelmayr ........ B21D 43/057 483/28 |

(Continued)

FOREIGN PATENT DOCUMENTS

| DE | 10128189 A1 * | 12/2002 | ............. B21D 43/05 |
| DE | 10128189 A1 | 12/2002 | |

(Continued)

OTHER PUBLICATIONS

Office Action issued in corresponding Japanese Patent Application No. 2015-241068, dated May 24, 2017 with English Translation.
(Continued)

*Primary Examiner* — Shelley M Self
*Assistant Examiner* — Jared O Brown
(74) *Attorney, Agent, or Firm* — McDermott Will & Emery LLP

(57) ABSTRACT

A workpiece conveying apparatus includes: a conveying table including a workpiece supporting mechanism; a first arm and a second arm each having one end pivotally coupled to the conveying table; a first moving unit coupled to another end of the first arm; a second moving unit coupled to another end of the second arm; and a posture control unit configured to control a posture of the conveying table through control of an angle between the conveying table and one of the first arm and the second arm, in which the first and second moving units are movable by a moving mechanism in a workpiece conveying direction, in which the conveying table is lifted up and down through a change of an interval between the first and second moving units, and in which these moving units are moved in the same direction to convey the workpiece.

4 Claims, 23 Drawing Sheets

(52) U.S. Cl.
CPC ........... *B65G 47/902* (2013.01); *B65G 47/91* (2013.01); *B65G 47/967* (2013.01); *B65G 54/02* (2013.01)

(56) References Cited

U.S. PATENT DOCUMENTS

| | | | |
|---|---|---|---|
| 7,484,922 B2* | 2/2009 | Harsch | B21D 43/05 100/207 |
| 2010/0047051 A1* | 2/2010 | Knobel | B25J 9/1065 414/751.1 |
| 2013/0309050 A1* | 11/2013 | Takeda | B21D 43/105 414/222.07 |

FOREIGN PATENT DOCUMENTS

| | | |
|---|---|---|
| JP | S53-081980 U | 7/1978 |
| JP | H11-292479 A | 10/1999 |
| JP | 2005-144555 A | 6/2005 |
| JP | 2011-079004 A | 4/2011 |
| JP | 2011079004 A * | 4/2011 |

OTHER PUBLICATIONS

Extended Search Report issued in corresponding European Patent Application No. 16203036.5, dated May 8, 2017.
Office Action issued in corresponding Chinese Patent Application No. 201611031225.9, dated Apr. 28, 2018.

* cited by examiner

EXAMPLE OF METHOD OF INCREASING LIFTING AMOUNT

WORKPIECE CONVEYING APPARATUS CAN BE CONCENTRATED WITHIN COMPACT REGION

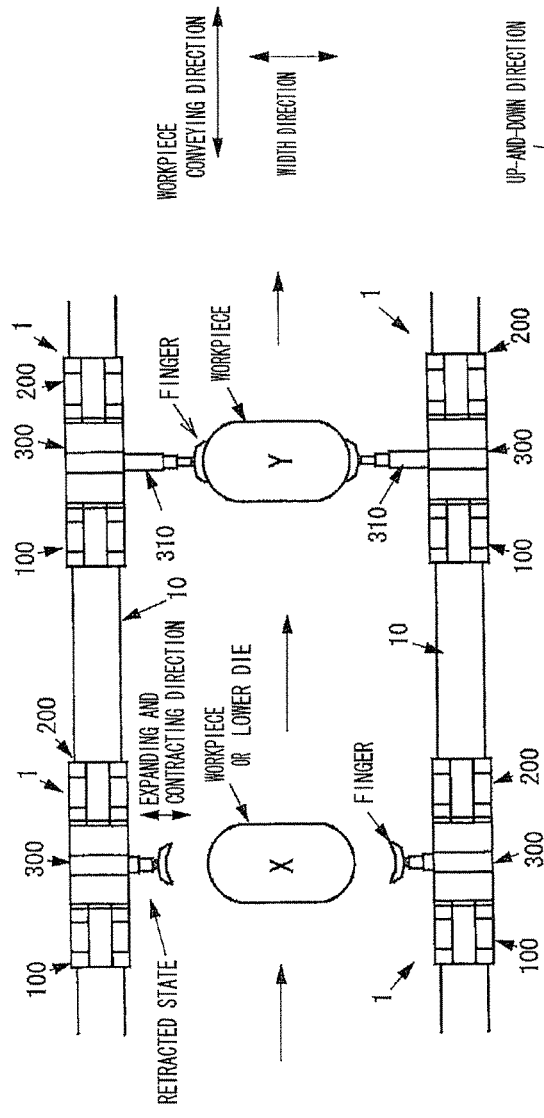
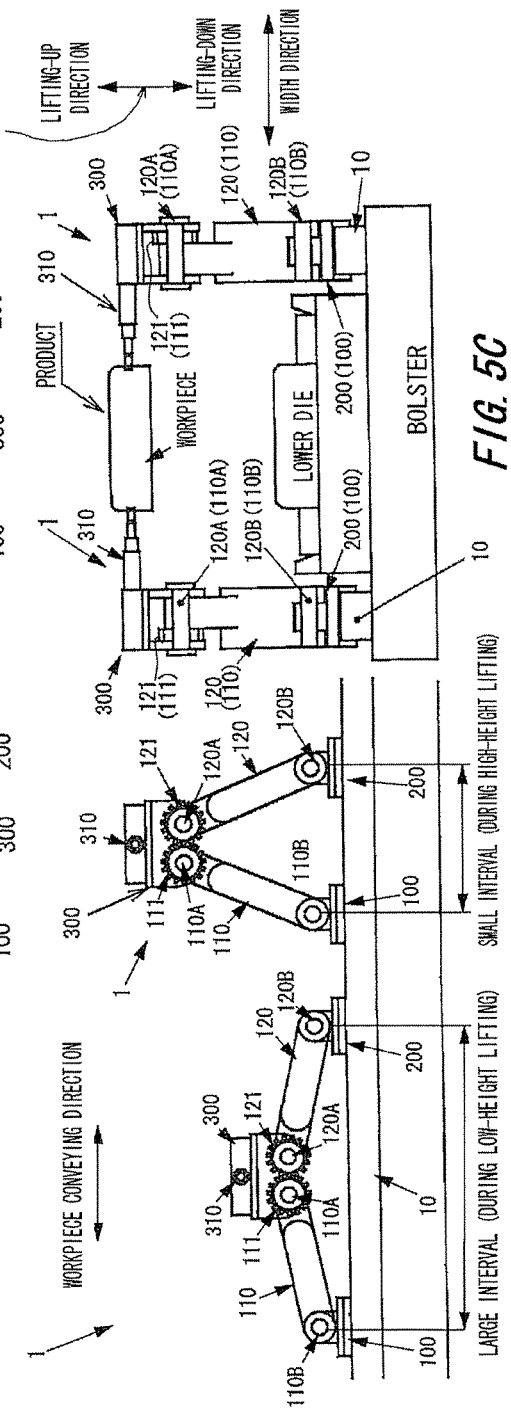
FIG. 5B
FIG. 5A
FIG. 5C

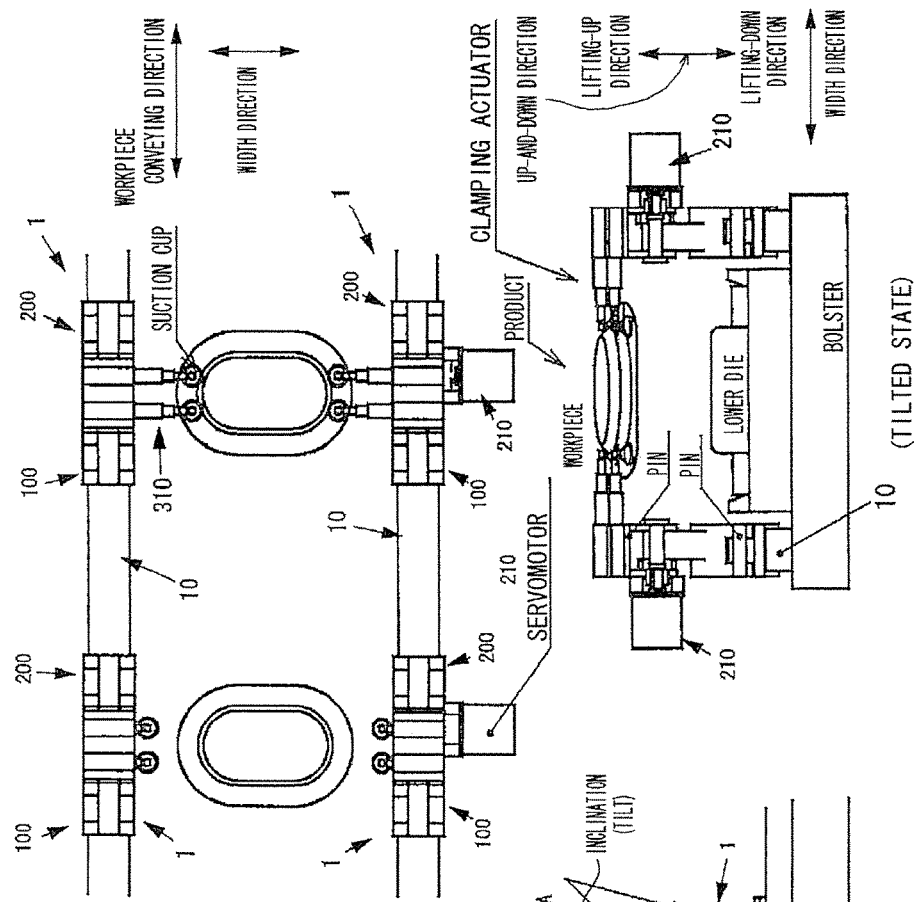
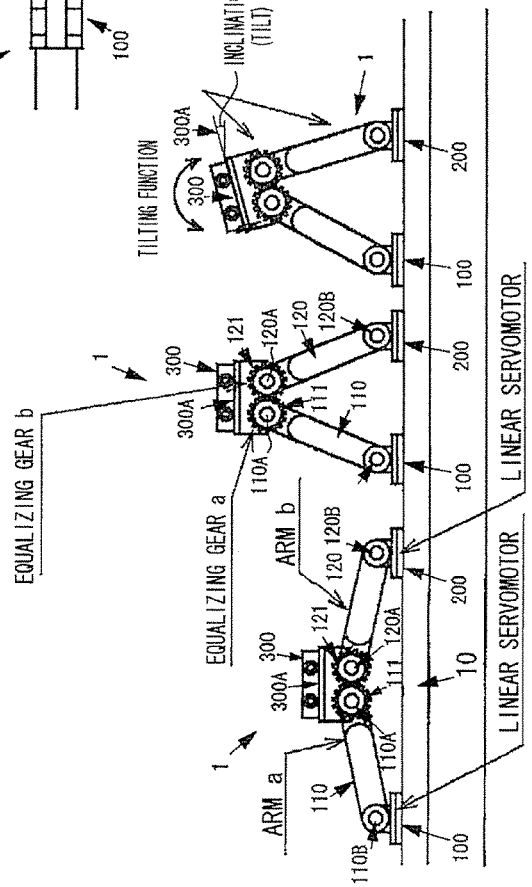
FIG. 8B
FIG. 8C
FIG. 8A

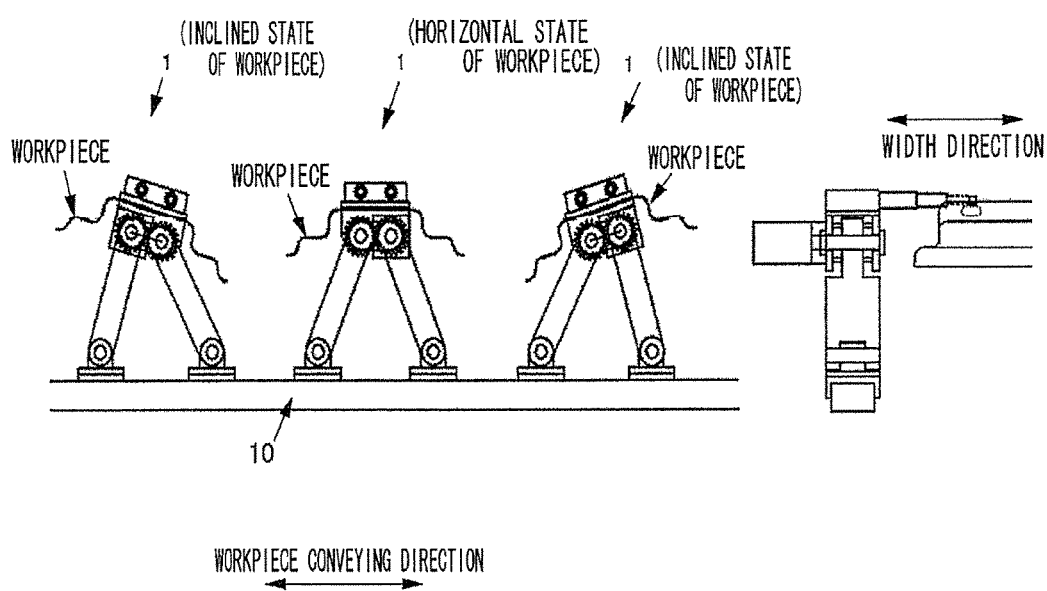

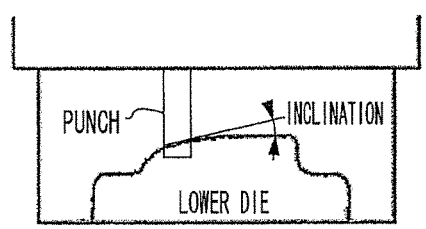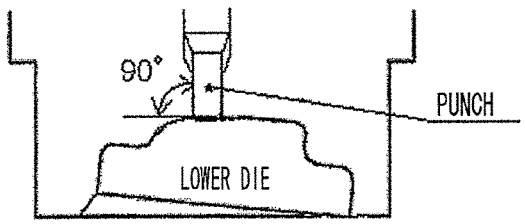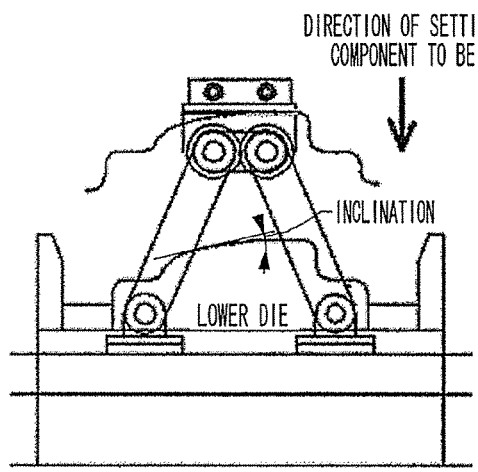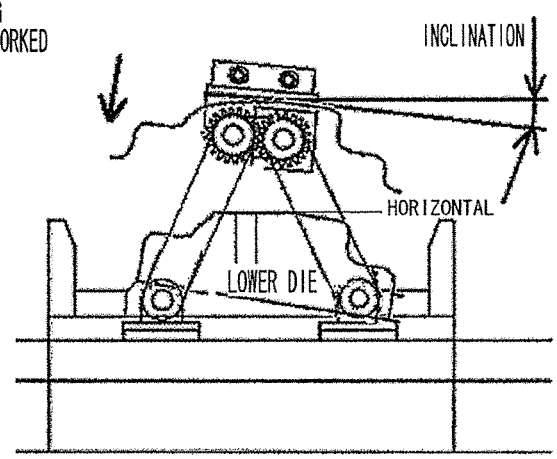
FIG. 10A                FIG. 10B

FIG. 11
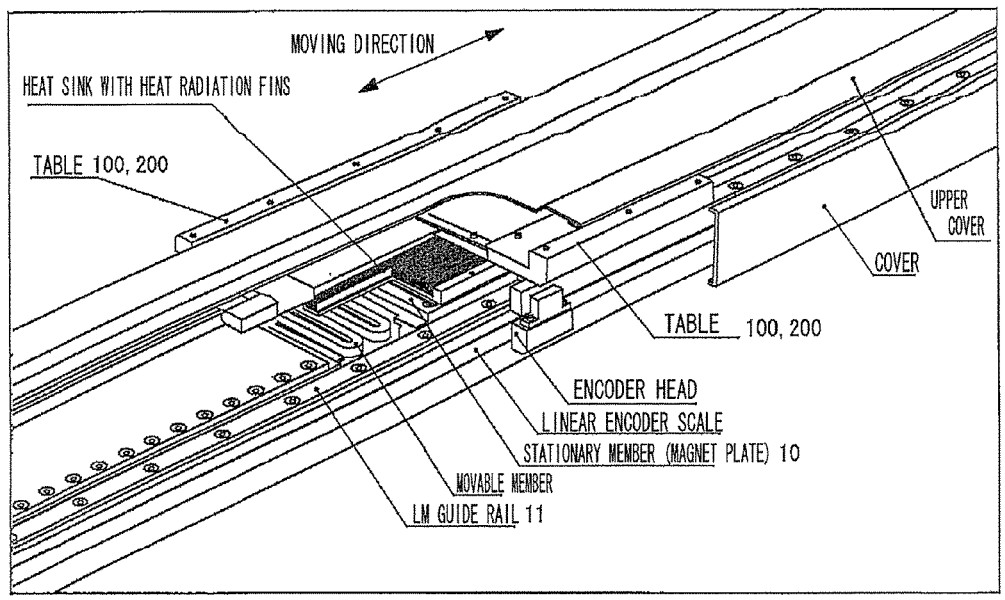
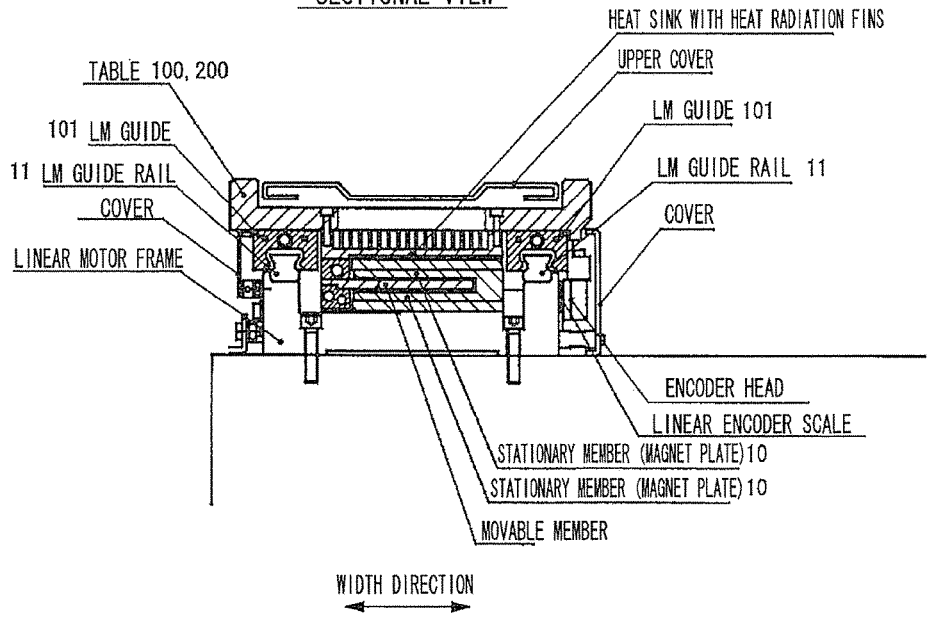

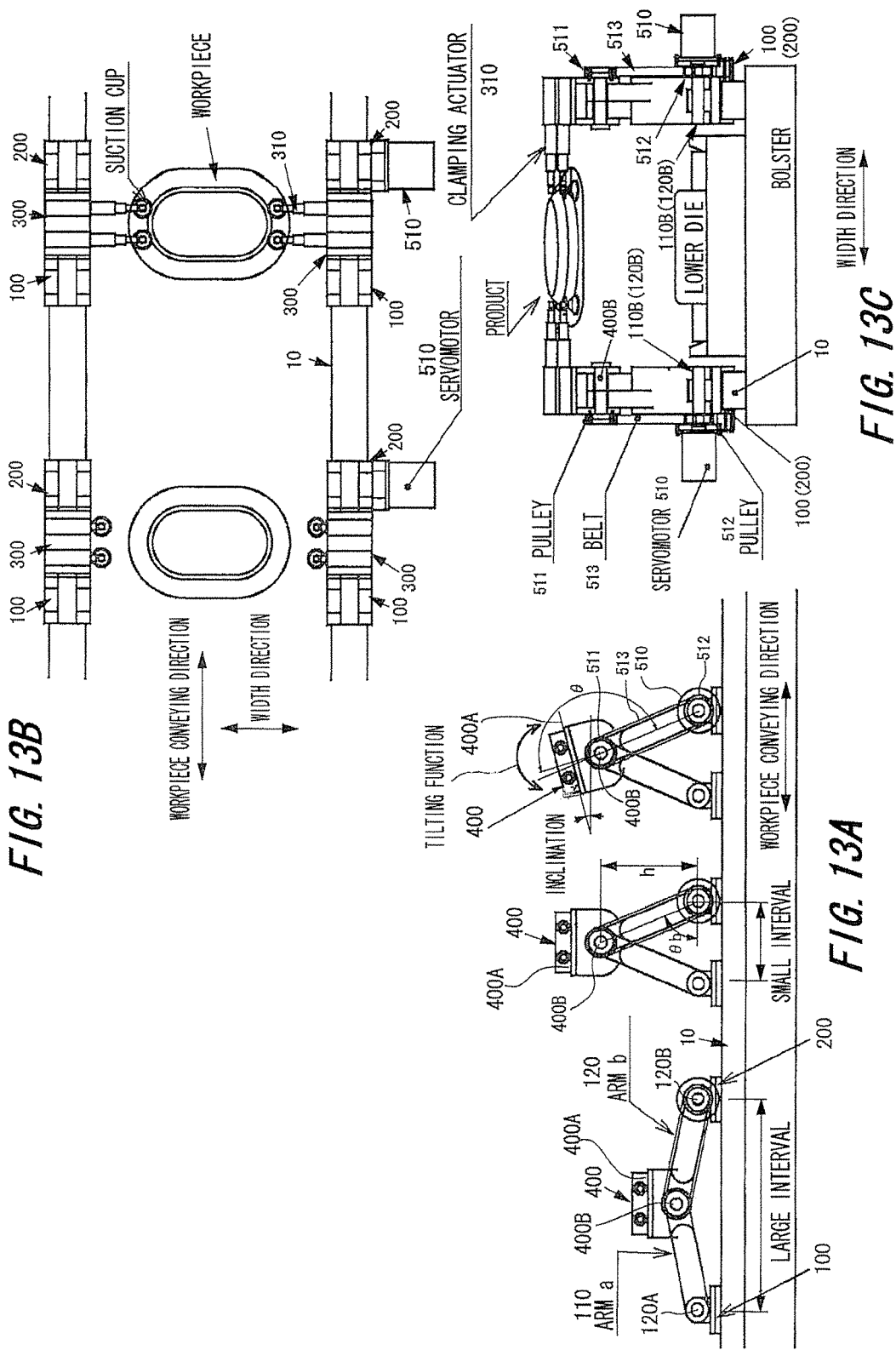

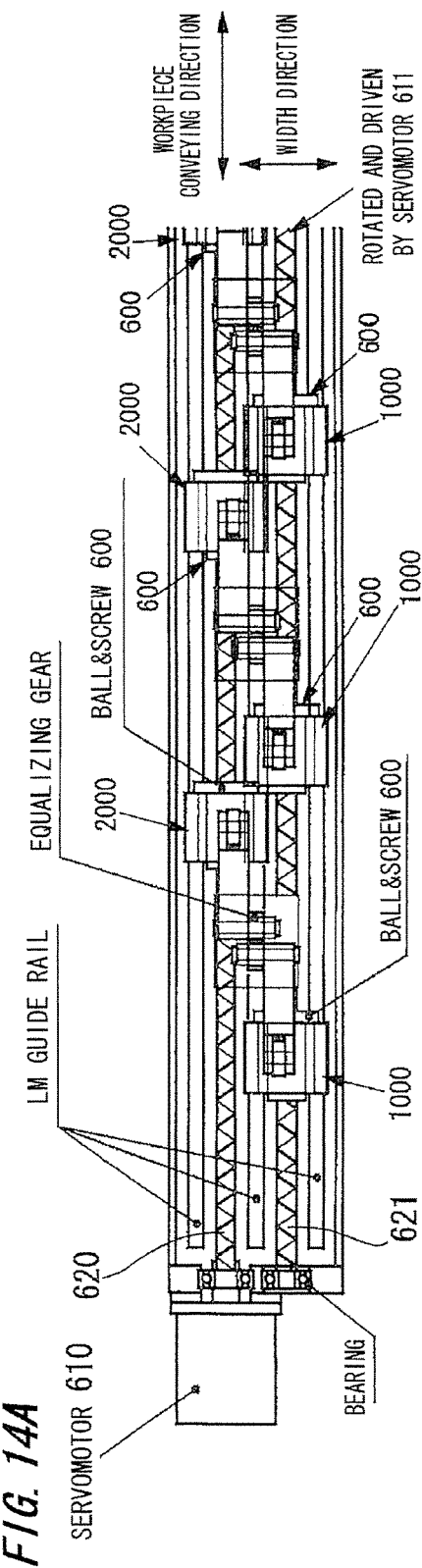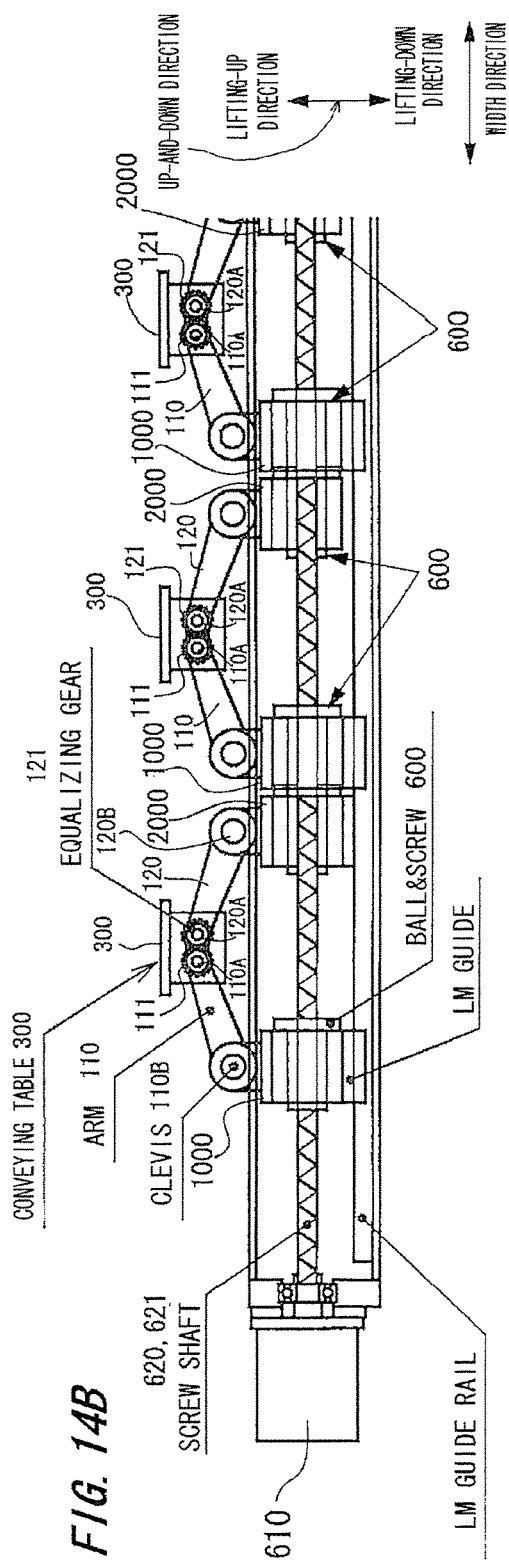

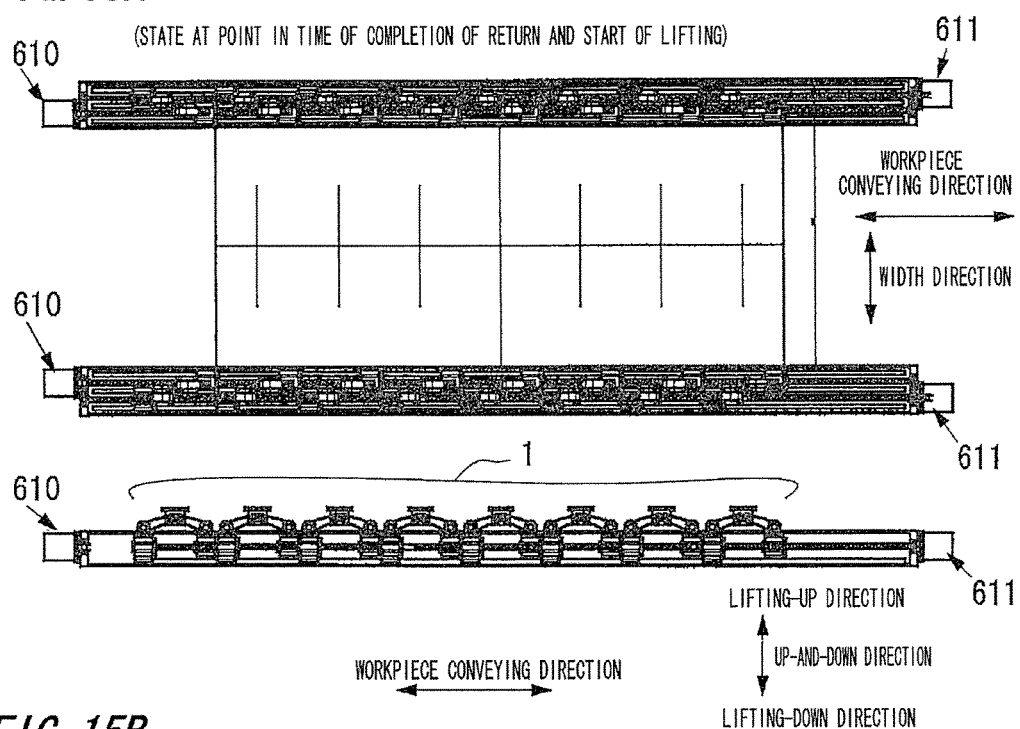
FIG. 15A STRUCTURE OF INTEGRAL CONVEYANCE IN ALL STEPS
(STATE AT POINT IN TIME OF COMPLETION OF RETURN AND START OF LIFTING)
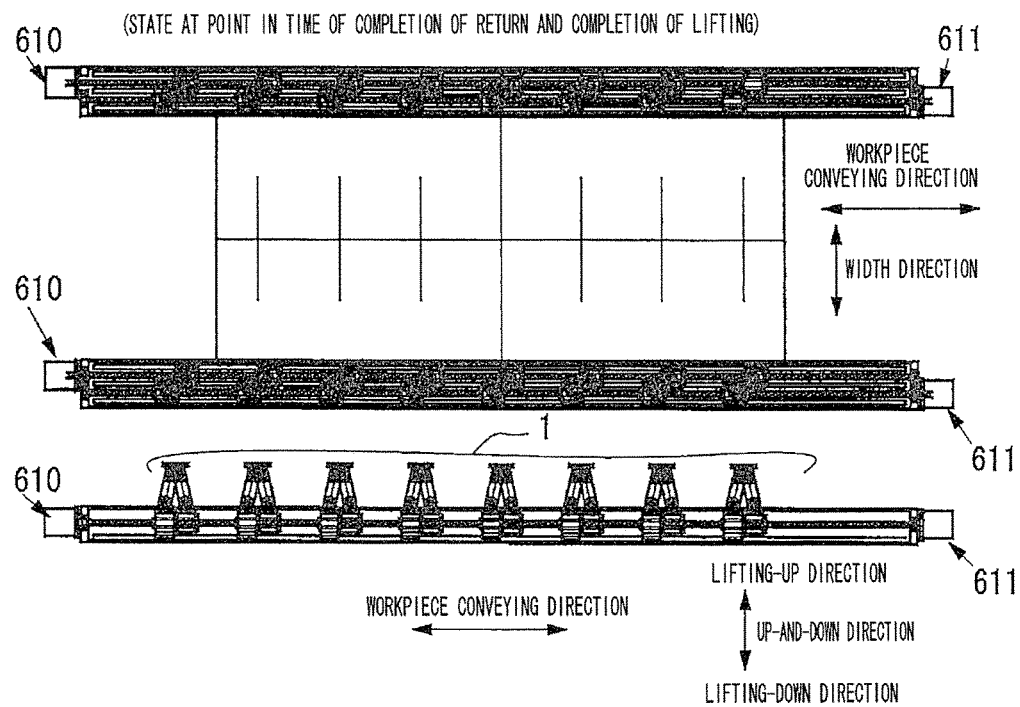
FIG. 15B (STATE AT POINT IN TIME OF COMPLETION OF RETURN AND COMPLETION OF LIFTING)

FIG. 16

<EXAMPLE OF FORMING LOAD AT BOTTOM DEAD CENTER OF FRAME STRUCTURE COMPONENT OF AUTOMOBILE>

(RELATED-ART TRANSFER WORKING)

| STEP | 1ST STEP | 2ND STEP | 3RD STEP | 4TH STEP | 5TH STEP |
|---|---|---|---|---|---|
| MATERIAL STRENGTH | DRAWING | TRIMMING | RESTRIKING | PIERCING | PIERCING |
| 980MPa | 5700 | 0 | 6600 | 0 | 0 |
| | | | TOTAL LOAD AT BOTTOM DEAD CENTER | | 12300kN |

F RIGHT = (1200 × 5700+3200 × 6600)/6400 =      4369 kN
F LEFT = (5700+6600)−4369 =      7931 kN

ECCENTRIC LOAD RATIO = (7931−4369)/(5700+6600) × 100 =      29 %

| STEP | 1ST STEP | 2ND STEP | 3RD STEP | 4TH STEP | 5TH STEP |
|---|---|---|---|---|---|
| MATERIAL STRENGTH | DRAWING | TRIMMING | RESTRIKING | PIERCING | PIERCING |
| 1500MPa | 11500 | 0 | 9200 | 0 | 0 |
| | | | TOTAL LOAD AT BOTTOM DEAD CENTER | | 20700kN |

F RIGHT = (1200 × 11500+3200 × 9200)/6400 =      6756 kN
F LEFT = (1500+9200)−6756 =      13944 kN

ECCENTRIC LOAD RATIO = (13944−6756)/(13944+6756) × 100 =      35 %

(TRANSFERRING PERFORMED IN ORDER OF INTERCHANGED STEPS)

| STEP | 1ST STEP | 2ND STEP | 3RD STEP | 4TH STEP | 5TH STEP |
|---|---|---|---|---|---|
| MATERIAL STRENGTH | TRIMMING | DRAWING | RESTRIKING | PIERCING | PIERCING |
| 1500MPa | 0 | 11500 | 9208 | 0 | 0 |
| | | | TOTAL LOAD AT BOTTOM DEAD CENTER | | 20700kN |

F RIGHT = (2200 × 11500+3200 × 9200)/6400 =      8553 kN
F LEFT = (1500+9200)−8553 =      12147 kN

ECCENTRIC LOAD RATIO = (12147−8553)/(12147+8553) × 100 =      17 %

ECCENTRIC LOAD CALCULATION

GENERAL SOLUTION $$F\ RIGHT = (L1 \times F1 + L2 \times F2 + L3 \times F3 + L4 \times F4 + L5 \times F5)/L$$

$$F\ LEFT = (F1 + F2 + F3 + F4 + F5) - (F\ RIGHT)$$

$$ECCENTRIC\ LOAD\ RATIO = (F\ LEFT - F\ RIGHT)/(F1 + F2 + F3 + F4 + F5) \times 100$$

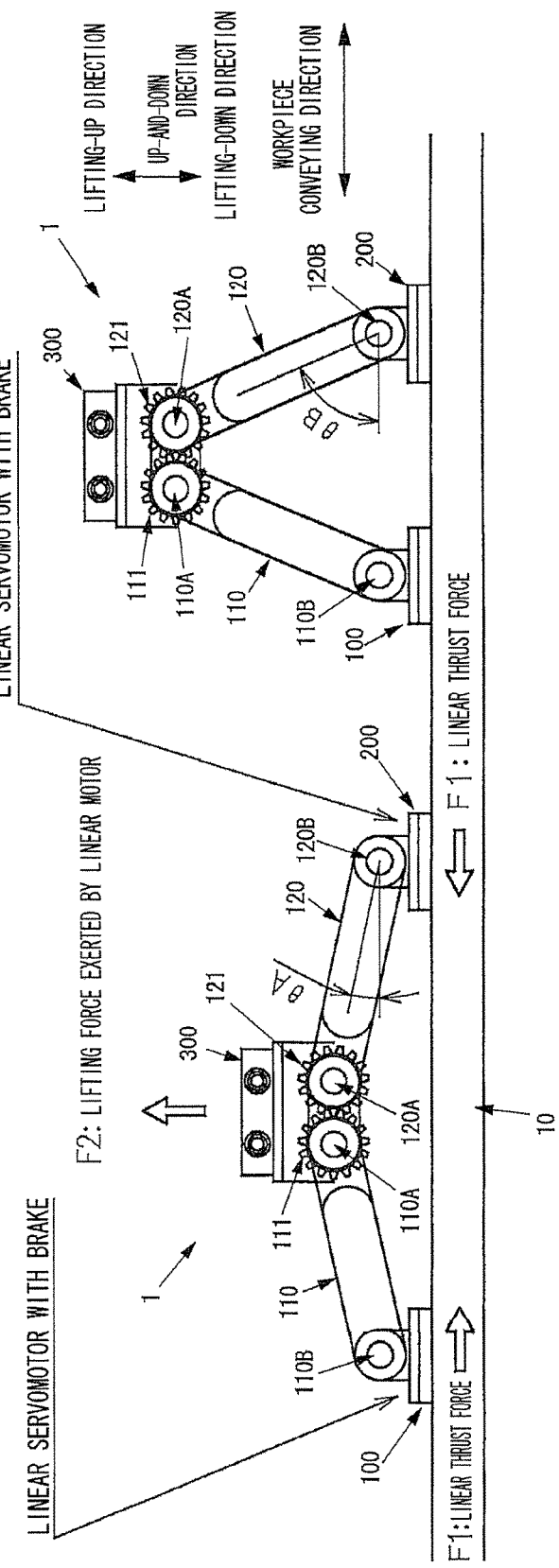

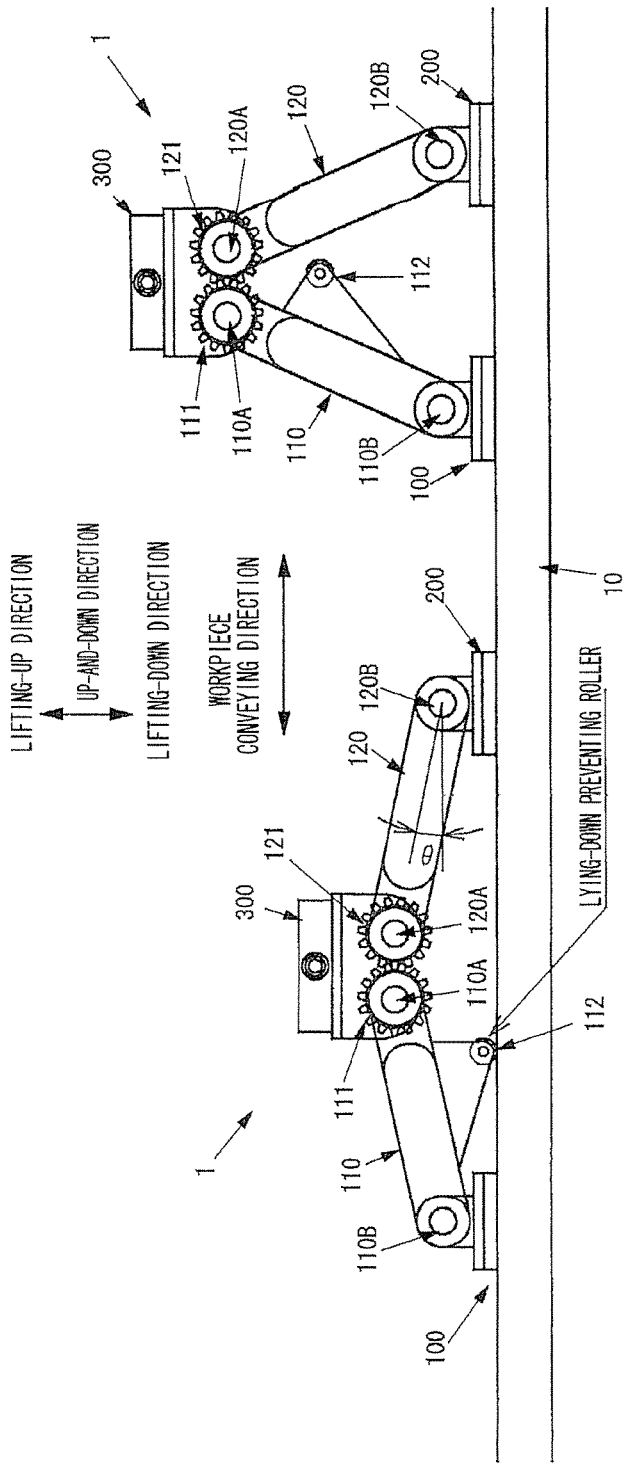
FIG. 19 LIFTING MASS CALCULATION (2)

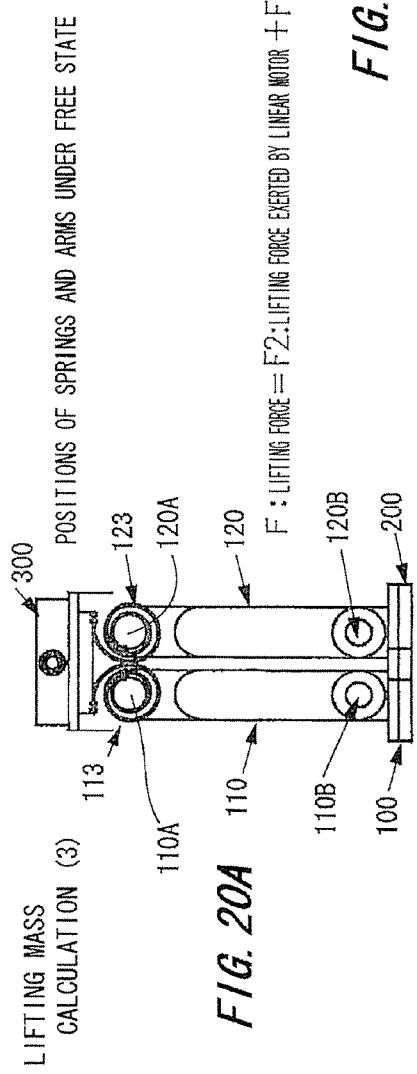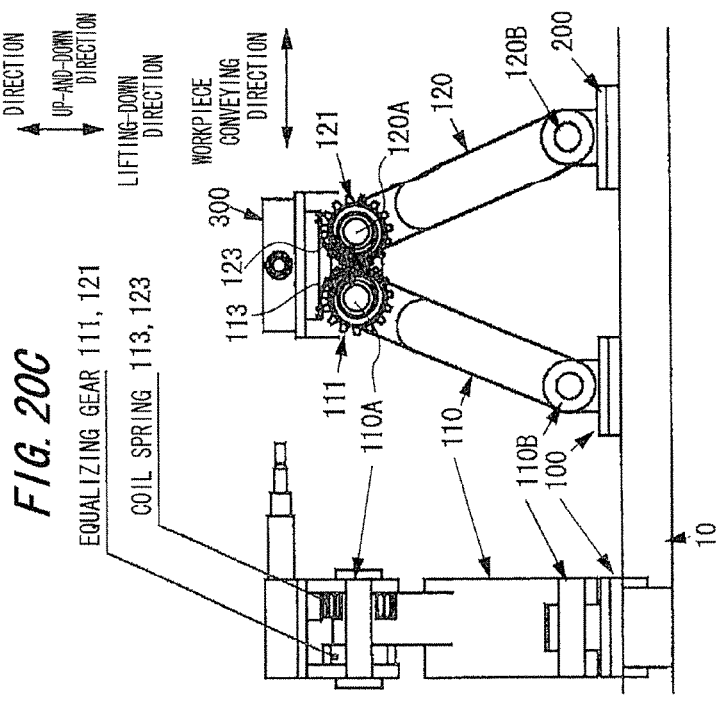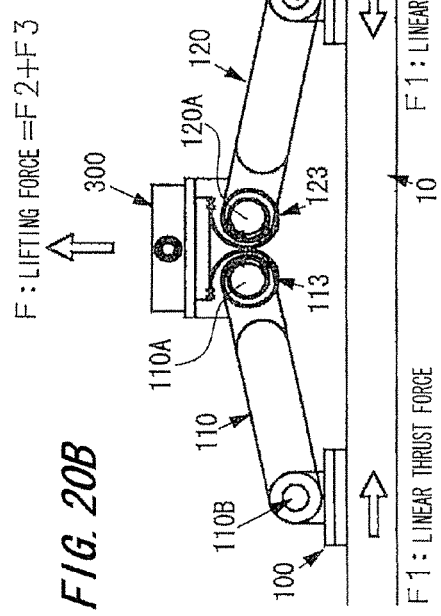

EXAMPLE OF CONVEYANCE OF PRODUCT AT DIFFERENT HEIGHTS OF SUCTION PADS

STRUCTURE OF GENERAL TRANSFER-CONVEYING APPARATUS

WHILE MATERIALS ARE TRANSFER-CONVEYED USING FINGERS, SUCTION CUPS, AND THE LIKE MOUNTED TO FEED BARS ARRANGED ON FRONT AND REAR SIDES, PROCESSING HAVING MULTIPLE STEPS IS PERFORMED.

FIG. 23A Prior Art

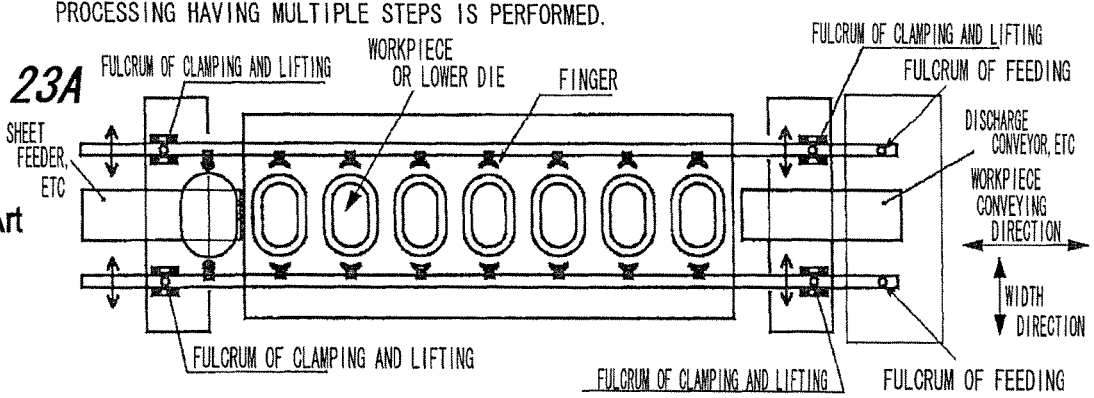

MATERIALS IN MULTIPLE STEPS ARE NIPPED AND CONVEYED BY FRONT AND REAR FEED BARS. DISTANCE BETWEEN RIGHT AND LEFT FULCRUMS OF CLAMPING AND LIFTING OF EACH FEED BAR IS LONG. THUS, CHARACTERISTIC FREQUENCY IS LOW, AND FEED BARS VIBRATE IN CLAMPING DIRECTION AND LIFTING DIRECTION DURING HIGH-SPEED OPERATION. CONSEQUENTLY, MATERIALS MAY SLIP OFF, OR CLAMPING POSITION ERROR MAY OCCUR. AS COUNTERMEASURE FOR THIS, IT IS CONCEIVABLE TO PREPARE RIGID FEED BARS, BUT INERTIA OF FEED BARS IS INCREASED. THUS, INCREASE IN CAPACITY OF DRIVING MOTOR IS INEVITABLY REQUIRED.

FIG. 23B Prior Art

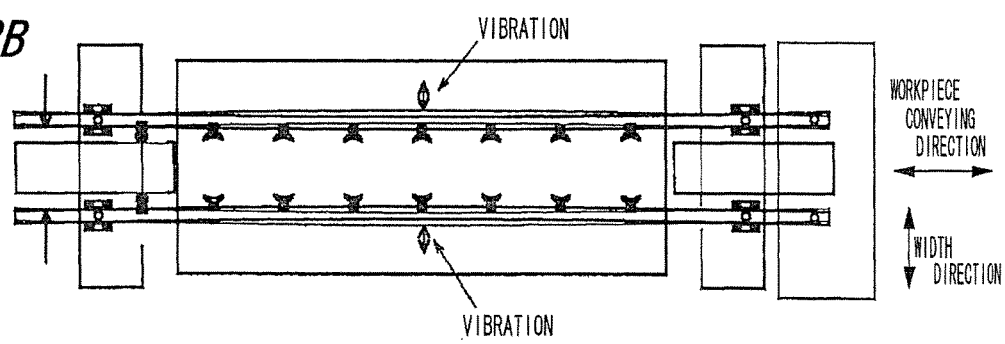

FIG. 23C Prior Art

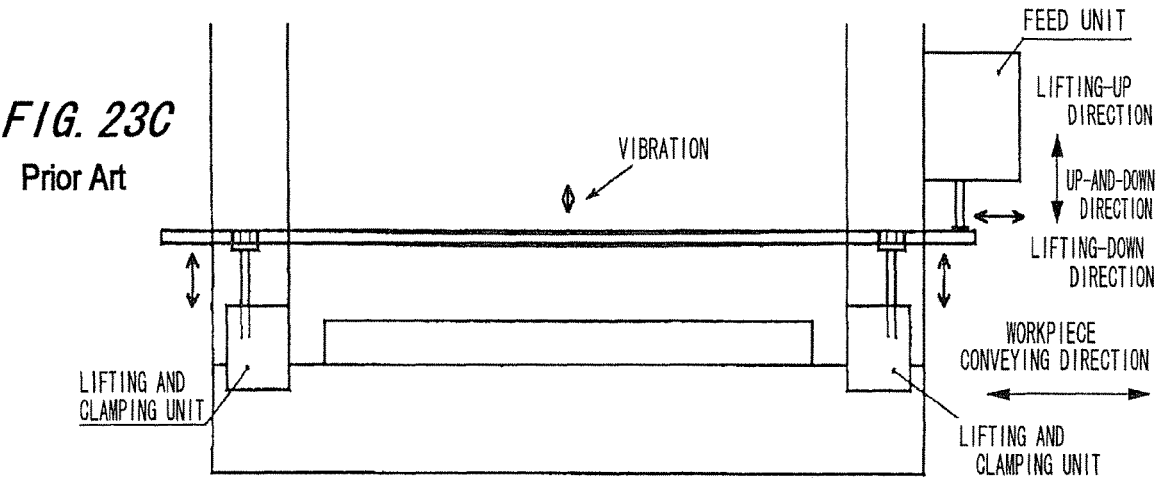

WORKPIECE CONVEYING APPARATUS FOR A PRESSING MACHINE

BACKGROUND OF THE INVENTION

1. Field of the Invention

The present invention relates to a workpiece conveying apparatus for a pressing machine (press machine).

2. Description of the Related Art

As a workpiece (material) conveying apparatus for a transfer press including a plurality of dies for multiple steps (a plurality of steps) aligned along a workpiece conveying direction on one slide or bolster, there has been known a transfer apparatus configured to sequentially convey workpieces through the plurality of dies for the multiple steps (the plurality of steps) from an upstream die to a downstream die.

Hitherto, in the transfer apparatus of this type, transfer working is performed as follows. For example, as illustrated in FIG. 22, two feed bars 10A and 10B extending in the workpiece conveying direction and being arranged opposed to each other approach to, from both sides, workpieces (material) being molded in respective stages (a first stage to a sixth stage are illustrated in FIG. 22) for multiple steps to clamp the workpieces in the respective steps with fingers 20A to 25A and fingers 20B to 25B. In the clamped state, the workpieces are lifted up, advanced (moved to downstream in the workpiece conveying direction), and lifted down. After that, the workpieces are unclamped (the feed bars 10A and 10B are moved apart from each other to release the workpieces) and returned (to original upstream positions in the workpiece conveying direction). Those operations are repeated to convey and work the workpieces through the respective stages.

In the above-mentioned related-art conveying apparatus, in order to achieve operations of the feed bars such as lifting-up-and-down operations, clamping and unclamping operations, and advancing and returning operations, there is often used, for example, a linear-motion mechanism such as a ball screw or a rack and pinion.

Herein, Patent Literature 1 corresponds to Japanese Patent Application Laid-open No. 2011-79004.

Accordingly, in the related-art transfer apparatus, the two feed bars require the plurality of fingers corresponding to the respective stages to hold the workpieces in the respective stages. Consequently, weights of movable components are increased, and there is needed a driving unit capable of exerting a large driving force for simultaneously conveying the workpieces (materials) in all of the stages.

Further, a driving unit for lifting up and down, a driving unit (feed unit) for advancing and returning, and a driving unit for clamping and unclamping are driven by separate servomotors or the like (see FIG. 23A to FIG. 23C). As a result, cost is increased. Further, high-power servomotors are required to move the feed bars (and finger units) having large lengths and large weights at high speed, and the movable components having large weights need to be supported. Thus, strength and rigidity of the apparatus also need to be increased. Consequently, in actuality, cost is increased.

Further, the feed bars (and the finger units) have relatively large lengths and large inertia, and hence higher speed may cause resonance in the feed bars. Thus, in actuality, critical speed is low, and the related-art feed bars are not suitable for high-speed conveyance (see FIG. 23B and FIG. 23C). Further, the movable components have large weights. Thus, in actuality, vibration noise is increased along with an increase in speed.

In recent years, with development of linear motors, similarly to the apparatus described in Japanese Patent Application Laid-open No. 2011-79004, there is an apparatus including the feed bars and the fingers configured to perform the above-mentioned lifting-up, clamping, lifting-down, and unclamping operations by linear motors under a state in which all of the feed bars and the fingers are supported through link mechanisms. However, similarly to the related-art apparatus, the apparatus described in Japanese Patent Application Laid-open No. 2011-79004 has a configuration of advancing and returning all of the feed bars and the fingers. Accordingly, a high-power and large-volume driving unit for advancing and returning is needed. The movable components have large weights, and hence, in actuality, a limitation is imposed on high-speed conveyance.

Further, there is also developed an apparatus of a type in which a linear feeder is interposed between a feed bar and fingers. However, in this type, the above-mentioned advancing and returning operations are merely substituted by an operation of moving the fingers relative to the feed bar in the workpiece conveying direction using a linear motor. In actuality, the related-art driving units as having been provided are used for the lifting-up, lifting-down, clamping, and unclamping operations. The apparatus of this type is actually an apparatus that inevitably requires a high-power servomotor configured to drive large inertia including the feed bar, and is not suitable for high-speed conveyance similarly to the related-art apparatus because of the large inertia.

SUMMARY OF THE INVENTION

Therefore, according to one embodiment of the present invention, there is provided a workpiece conveying apparatus for a pressing machine, including:

a conveying table including a workpiece supporting mechanism configured to support a workpiece in a releasable manner;

a first arm and a second arm each having one end coupled to the conveying table so as to be pivotable through a pivot axis in a substantially vertical plane extending along a workpiece conveying direction;

a first moving unit to which another end of the first arm is coupled so as to be pivotable through a pivot axis;

a second moving unit to which another end of the second arm is coupled so as to be pivotable through a pivot axis; and a posture control unit configured to control a posture of the conveying table through control of at least one of an angle between the conveying table and one of the first arm and the second arm, an angle between the first arm and the first moving unit, and an angle between the second arm and the second moving unit, in which the first moving unit and the second moving unit are movable by a moving mechanism in the workpiece conveying direction, in which the conveying table is lifted up and down through a change of an interval between the first moving unit and the second moving unit, and in which the first moving unit and the second moving unit are moved in the same workpiece conveying direction so as to move the conveying table in the workpiece conveying direction, to thereby convey the workpiece.

According to one embodiment of the present invention, the pivot axis coupling the conveying table and the first arm to each other, and the pivot axis coupling the conveying table and the second arm to each other may be formed of separate pivot axises.

According to one embodiment of the present invention, the posture control unit may include:

a first gear, which is substantially integrated with the first arm, and supported so as to be pivotable about the pivot axis coupling the conveying table and the first arm to each other; and a second gear, which is meshed with the first gear, substantially integrated with the second arm, and supported so as to be pivotable about the pivot axis coupling the conveying table and the second arm to each other.

According to one embodiment of the present invention, the pivot axis coupling the conveying table and the first arm to each other, and the pivot axis coupling the conveying table and the second arm to each other may be formed of a common pivot axis.

According to one embodiment of the present invention, the posture control unit may include a servomotor mounted substantially integrally with the conveying table, one of the first arm and the second arm may be pivotable about the common pivot axis by the servomotor with respect to the conveying table, and through control of drive of the servomotor, the angle between the conveying table and one of the first arm and the second arm may be controlled, thereby controlling the posture of the conveying table.

According to one embodiment of the present invention, provided is a workpiece conveying apparatus, in which, when the workpiece conveying apparatus includes a plurality of workpiece conveying apparatus arranged in the workpiece conveying direction, the plurality of workpiece conveying apparatus are configured to prevent mutual interference, and to be movable along the workpiece conveying direction while passing each other.

According to one embodiment of the present invention, the moving mechanism may include a linear motor.

BRIEF DESCRIPTION OF THE DRAWINGS

FIG. 5A is a front view for illustrating an overall configuration of a workpiece conveying apparatus according to a modified example (example including a workpiece supporting device including fingers) of the first embodiment (as viewed from the horizontal direction orthogonal to the workpiece conveying direction).

FIG. 5B is a partial plan view of FIG. 5A.

FIG. 5C is a right-hand side view (sectional view) of FIG. 5A.

FIG. 8A is a front view for illustrating an overall configuration of a workpiece conveying apparatus according to a third embodiment of the present invention (as viewed from the horizontal direction orthogonal to the workpiece conveying direction).

FIG. 8B is a partial plan view of FIG. 8A.

FIG. 8C is a right-hand side view (sectional view) of FIG. 8A.

FIG. 9 is a front view for illustrating a state in which each workpiece conveying apparatus according to the third embodiment supports and conveys a workpiece while inclining (leaning or tilting) the workpiece at an arbitrary angle.

FIG. 10A is a front view for illustrating a state in which an arrival angle of a punch is oblique to a surface of the workpiece as in a case where the workpiece is lowered with horizontal balance.

FIG. 10B is a front view for illustrating a state in which the punch can be vertically pressed into the surface of the workpiece when the workpiece conveying apparatus according to the third embodiment is adopted.

FIG. 11 are a perspective view and a sectional view for illustrating a configuration example of a linear servomotor as an example of a moving mechanism to be used for the workpiece conveying apparatus according to the first embodiment.

FIG. 13A is a front view for illustrating an overall configuration of a workpiece conveying apparatus according to a fifth embodiment of the present invention (as viewed from the horizontal direction orthogonal to the workpiece conveying direction).

FIG. 13B is a partial plan view of FIG. 13A.

FIG. 13C is a right-hand side view (sectional view) of FIG. 13A.

FIG. 14A is a plan view for illustrating a workpiece conveying apparatus according to a sixth embodiment of the present invention (example of adopting a ball screw mechanism as the moving mechanism).

FIG. 14B is a front view of FIG. 14A.

FIG. 15A are a plan view and a front view for illustrating an example of an overall configuration of a pressing machine using the workpiece conveying apparatus according to the sixth embodiment (state at a point in time of completion of return and start of lifting).

FIG. 15B are a plan view and a front view for illustrating a state at a point in time of completion of return and completion of lifting.

FIG. 16 are tables for showing calculation results of a comparison between an eccentric load ratio in related-art transfer working and an eccentric load ratio in transfer working according to the second embodiment.

FIG. 18 is a front view for illustrating a method of calculating a lifting force (lifting mass) of the workpiece conveying apparatus according to the first embodiment.

FIG. 19 is a front view for illustrating an example of a workpiece conveying apparatus according to a seventh embodiment of the present invention (configuration example including a lying-down preventing roller 112).

FIG. 20A is a front view for illustrating a workpiece conveying apparatus (in a maximum lifting state) according to an eighth embodiment of the present invention (example of a case of adopting springs 113 and 123 as a posture control unit).

FIG. 20B is a front view for illustrating a state in which a height of a conveying table of the workpiece conveying apparatus of FIG. 20A is lowered.

FIG. 20C is a front view for illustrating a configuration example of adding equalizing gears to the workpiece conveying apparatus of FIG. 20A.

FIG. 23A is a plan view for illustrating the workpiece conveying apparatus (feed bar system) for the related-art pressing machine (transfer press).

FIG. 23B is a plan view for illustrating vibrations generated in the workpiece conveying apparatus.

FIG. 23C is a front view of FIG. 23B.

DESCRIPTION OF THE EMBODIMENTS

Now, with reference to the accompanying drawings, description is made of a workpiece conveying apparatus for a pressing machine according to an exemplary embodiment of the present invention. The present invention is not limited to the embodiment described below.

The present invention has been made in view of the above-mentioned circumstances, and has an object to provide a workpiece conveying apparatus, with a lightweight and compact configuration achieved relatively easily at low cost, capable of increasing a degree of freedom in posture of a workpiece during workpiece conveyance while reducing vibration noise, and capable of contributing to an increase in conveying speed of the workpiece, to a reduction in cycle time period, and to an increase in production efficiency.

First Embodiment

Figure 1:
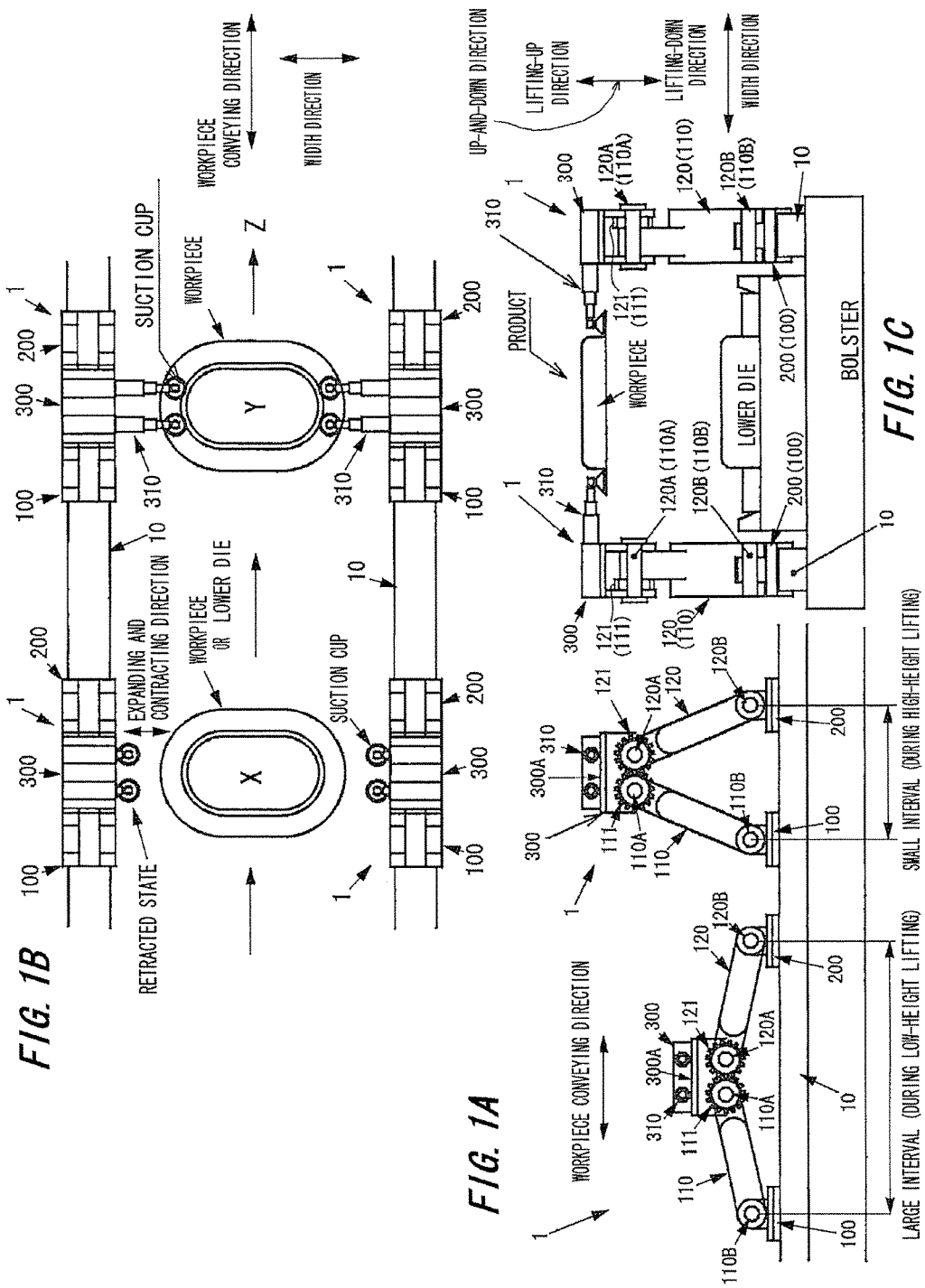
FIG. 1A is a front view for illustrating an overall configuration of a workpiece conveying apparatus according to a first embodiment as an exemplary embodiment of the present invention (as viewed from a horizontal direction orthogonal to a workpiece conveying direction).
FIG. 1B is a partial plan view of FIG. 1A.
FIG. 1C is a right-hand side view (sectional view) of FIG. 1A.

As illustrated in FIG. 1A to FIG. 1C, a workpiece conveying apparatus 1 according to a first embodiment as an exemplary embodiment of the present invention includes a pair of linear motor tables (moving units: movable members) 100 and 200 to be used to feed a workpiece (used to move, for example, advance and return the workpiece along a workpiece conveying direction). The linear motor tables (moving units: movable members) 100 and 200 are movable in the workpiece conveying direction above a linear motor unit 10 (stationary member: LM guide rail 11) extending in the workpiece conveying direction. Further, the linear motor table 100 supports one end (lower end) of a corresponding arm 110 so as to be pivotable (rotatable or rockable) through a lower pivot shaft (or axis) 110B, and the linear motor table 200 supports one end (lower end) of a corresponding arm 120 so as to be pivotable (rotatable or rockable) through a lower pivot shaft (or axis) 120B.

Another ends (upper ends) of the arms 110 and 120 are connected (coupled) to a conveying table 300 so as to be pivotable (rotatable or rockable) through upper pivot shafts (or axises) 110A and 120A, to thereby support the conveying table 300. The conveying table 300 includes a workpiece supporting mechanism capable of supporting the workpiece in a releasable manner (such as a mechanism including a suction cup or the like arranged at a distal end of a clamping actuator 310 capable of expanding and contracting).

The arm 110 corresponds to a first arm according to the present invention, and the arm 120 corresponds to a second arm according to the present invention. The linear motor table 100 corresponds to a first moving unit according to the present invention, and the linear motor table 200 corresponds to a second moving unit according to the present invention.

FIG. 11 are illustrations of a configuration example of a linear servomotor including the linear motor tables (movable members) 100 and 200, the linear motor unit (magnet plate) 10 (stationary member: LM guide rail 11), and the like.

The linear servomotor corresponds to an example of a moving mechanism according to the present invention.

The linear motor tables (movable members) 100 and 200 can be driven and controlled independently of each other, and are configured so as to be movable independently of each other along a longitudinal direction of the linear motor unit 10 (LM guide rail 11).

The linear motor table (movable member) 100 (200) is formed substantially integrally with an LM guide 101. The LM guide 101 is engaged with the LM guide rail 11 stationarily and substantially horizontally placed on an apparatus frame side (or floor side), to thereby be linearly guided while being restrained in transverse movement. The engagement between the LM guide 101 and the LM guide rail 11 prevents the linear motor table from falling in a lateral direction (width direction substantially orthogonal to the workpiece conveying direction) of the drawing sheet of FIG. 1B even under a reaction force or the like applied when the clamping actuator 310 holds the workpiece.

Incidentally, as illustrated in FIG. 1B and FIG. 1C, the workpiece conveying apparatus 1 each including the linear motor tables (movable members) 100 and 200 and the linear motor unit (stationary member) 10 are arranged on both sides in the width direction with respect to the workpiece conveying direction across the workpiece or a die (lower die). The pair of opposed workpiece conveying apparatus 1 is configured to cooperate with each other to support and convey the workpiece. However, when the workpiece can be supported by only one of the workpiece conveying apparatus 1, only one of the workpiece conveying apparatus 1 may be used.

According to the workpiece conveying apparatus 1 of the first embodiment having the above-mentioned configuration, as illustrated in FIG. 1A, the two linear motor tables 100 and 200 are moved above the linear motor unit 10, that is, for example, the linear motor tables 100 and 200 are moved to approach to each other to enable the conveying table 300 and the workpiece to be lifted up, and the linear motor tables 100 and 200 are moved away from each other to enable the conveying table 300 and the workpiece to be lifted down. Thus, separate driving units for lifting up and down can be omitted.

In the workpiece conveying apparatus 1 according to the first embodiment, the lower end sides of the arms 110 and 120 are respectively pivoted about (pin-coupled to) the linear motor tables 100 and 200 through the lower pivot shafts (or axises) 110B and 120B so as to be rotatable. The upper end sides of the arms 110 and 120 are pivoted about (pin-coupled to) the conveying table 300 through the upper pivot shafts (or axises) 110A and 120A so as to be rotatable.

However, in this state, a posture of the conveying table 300, such as an inclination or a position thereof, is unstable. Accordingly, in order to prevent such unstable posture, gears 111 and 121 are fixed substantially integrally with the upper end sides of the arms 110 and 120, respectively, and mesh with each other. The gears 111 and 121 have the same number of teeth and the same module, and are arranged so as to be rotatable about and coaxial with the upper pivot shafts (or axises) 110A and 120A, respectively.

Even when the linear motor tables 100 and 200 are moved to pivot (rock) the arms 110 and 120 about the upper pivot shafts (or axises) 110A and 120A, respectively, the gears 111 and 121 meshed with each other and fixed to the upper end sides of the arms 110 and 120 can keep the conveying table 300 (flat surface 300A) supported by the upper pivot shafts (or axises) 110A and 120A of the arms 110 and 120, and the workpiece be always kept horizontal (level).

That is, in this case, an angle between the conveying table 300 and the first arm 110 (or the second arm 120) is controlled through the meshing between the gears 111 and 121, thereby controlling the posture of the conveying table.

The gear 111 corresponds to an example of a first gear according to the present invention, and the gear 121 corresponds to an example of a second gear according to the present invention.

Further, the gears 111 and 121, which are fixed to the upper end sides of the arms 110 and 120 and mesh with each other, correspond to an example of a posture control unit according to the present invention.

As long as the posture of the conveying table 300 can be controlled, the present invention is not limited to the case of keeping the conveying table 300 substantially horizontal. Thus, the first gear and the second gear are not limited to gears having the same number of teeth and the same module.

That is, any unit capable of controlling the posture of the conveying table through control of the angle between the conveying table 300 and the arm 110 (first arm) or the arm 120 (second arm) may be employed as the posture control unit according to the present invention.

As illustrated in FIG. 1B, the workpiece conveying apparatus 1 each including the linear motor tables 100 and 200, the arms 110 and 120, and the conveying table 300 are arranged on both sides across the workpiece or the die. The clamping actuator 310 or the like is mounted to each conveying table 300, thereby being capable of clamping and unclamping the workpiece. Therefore, unlike the related art, there can be omitted a driving unit having a large volume necessary to move all of the feed bars in order to clamp and unclamp the workpiece.

Further, during workpiece conveyance, as illustrated in FIG. 1A, in accordance with a product shape or the like, the workpiece can be conveyed between the front and rear conveying tables 300 while clamping heights are varied.

Figure 21:
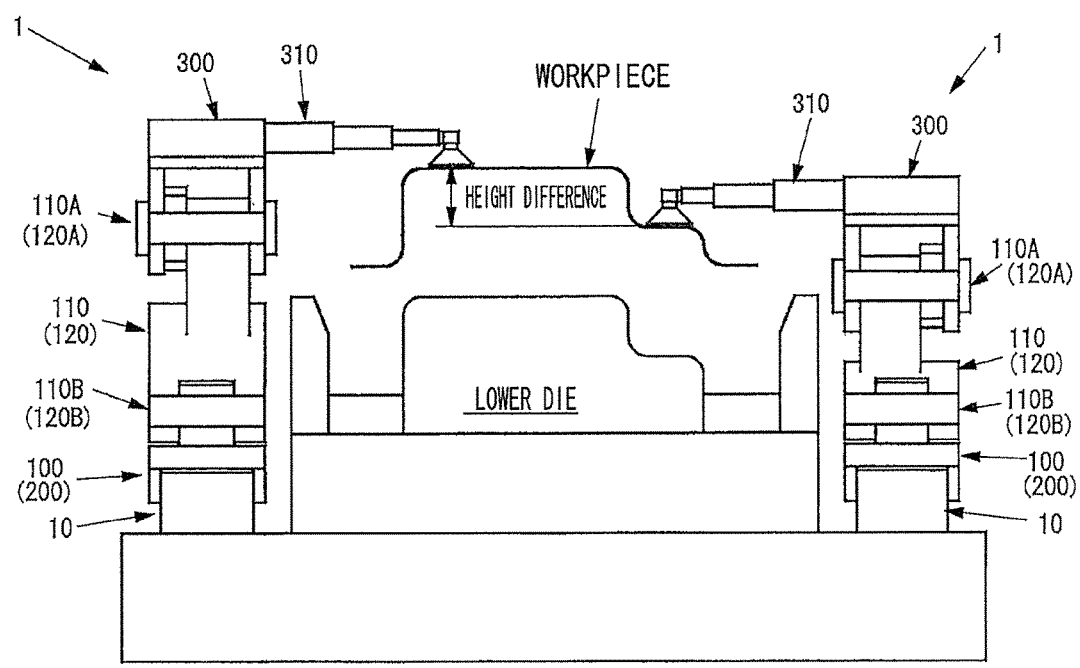
FIG. 21 is a side view for illustrating a state in which the workpiece is conveyed under a state in which clamping heights are varied as appropriate in accordance with a shape or the like of the workpiece between the workpiece conveying apparatus opposed to each other in a width direction with respect to the workpiece conveying direction.

In addition, between the workpiece conveying apparatus 1 and 1 opposed to each other in the width direction with respect to the workpiece conveying direction, the workpiece can be conveyed at different clamping heights as appropriate in accordance with a workpiece shape or the like (see FIG. 21).

When the conveying table 300 is shifted from a low position to a high position, the two linear motor tables 100 and 200 are moved in approaching directions to be brought close to each other, thereby being capable of shifting the conveying table 300 from the low position to the high position. Alternatively, under a state in which one of the linear motor tables 100 and 200 is stopped, another one of the linear motor tables 100 and 200 is moved, thereby being capable of shifting the conveying table 300 from the low position to the high position. In addition, both of the two linear motor tables 100 and 200 are moved in the same direction at different speed to be brought close to each other, thereby being capable of shifting the conveying table 300 from the low position to the high position. (The same holds true when the conveying table 300 is shifted from the high position to the low position.)

That is, according to the workpiece conveying apparatus 1 of the first embodiment, a height of the conveying table 300 can be changed as appropriate through a change of a relative distance (interval) between the two linear motor tables 100 and 200 in the workpiece conveying direction (see FIG. 1A and the like).

In the workpiece conveying apparatus 1 according to the first embodiment, specifically, the workpiece is conveyed in the following manner.

In the following, description is made of workpiece conveying operations of a certain pair of the workpiece conveying apparatus 1. However, in actuality, the plurality of workpiece conveying apparatus 1 are arranged in the workpiece conveying direction to correspond to respective working steps. Each workpiece conveying apparatus 1 conveys the workpiece from an upstream step (preceding step) to a downstream step (subsequent step) in a similar manner.

In Step 1, first, under a state in which the workpiece is supported (see FIG. 10), a pair of the workpiece conveying apparatus 1 each including the two linear motor tables 100 and 200 and being opposed to each other in the width direction (see FIG. 1C and FIG. 1B) is moved above the linear motor unit 10 from a current position (for example, the left position X in FIG. 1B) to a subsequent target position (for example, the right position Y in FIG. 1B).

In Step 2, the interval between the linear motor tables 100 and 200 in the workpiece conveying direction is increased at the position Y. Thus, the conveying table 300 and the workpiece are lifted down (lowered), and the workpiece is set on the lower die. Then, the suction cups are taken away, thereby cancelling support of the workpiece. After that, the clamping actuators 310 and the like are brought into a retracted state (state illustrated on the left side of FIG. 1B).

In Step 3, under this state, a slide (upper die) is lowered to perform press working.

In Step 4, during the press working, each workpiece conveying apparatus 1 is returned to an original position (the left position X in FIG. 1B). At this time, the interval between the linear motor tables 100 and 200 in the workpiece conveying direction is narrowed, and the conveying table 300 is lifted up to and kept at a predetermined height.

In subsequent Step 5, after the press working is finished so that there is no fear of interference with the slide, while the clamping actuators 310 and the like are extended again to be brought into a state illustrated on the right side of FIG. 1B, the interval between the linear motor tables 100 and 200 in the workpiece conveying direction is increased to lower the conveying table 300, and the suction cups suck the workpiece to support the workpiece.

In Step 6, after the workpiece is sucked in Step 5, the interval between the linear motor tables 100 and 200 in the workpiece conveying direction is narrowed, and the conveying table 300 and the workpiece are lifted up to the predetermined height (about a height at which the workpiece and the lower die do not interfere with each other) (see the state illustrated in FIG. 1C).

Further, the above-mentioned operations in Steps 1 to 6 are repeated, thereby conveying the workpiece from the preceding step to the subsequent step. The workpiece previously located at the position Y is conveyed to a subsequent target position Z by another workpiece conveying apparatus 1 in the same manner described above.

Press working is performed on the workpiece while the workpiece conveying apparatus 1 according to the first embodiment continuously conveys, through repetition of Steps described above, the workpiece onto dies aligned on one slide in the stage order.

However, use of the workpiece conveying apparatus 1 according to the first embodiment is not limited to the case where the workpiece conveying apparatus is used as the above-mentioned transfer apparatus. As a matter of course, the workpiece conveying apparatus may be used for conveyance of the workpiece between presses.

As described above, according to the workpiece conveying apparatus 1 of the first embodiment, the workpiece can be conveyed with a relatively lightweight and compact configuration including the linear motor tables 100 and 200, the arms 110 and 120, and the conveying table 300. Accordingly, the related-art feed bars having large sizes and large weights can be omitted, thereby being capable of omitting a large-volume actuator configured to move the feed bars and the like. Therefore, the lightweight and compact configuration can be achieved relatively easily at low cost. Thus, the lightweight and compact configuration can increase a degree of freedom in posture of the workpiece during workpiece conveyance while reducing vibration noise, and can contribute to an increase in conveying speed of the workpiece, a reduction in cycle time period, an increase in production efficiency, and the like.

Figure 2:
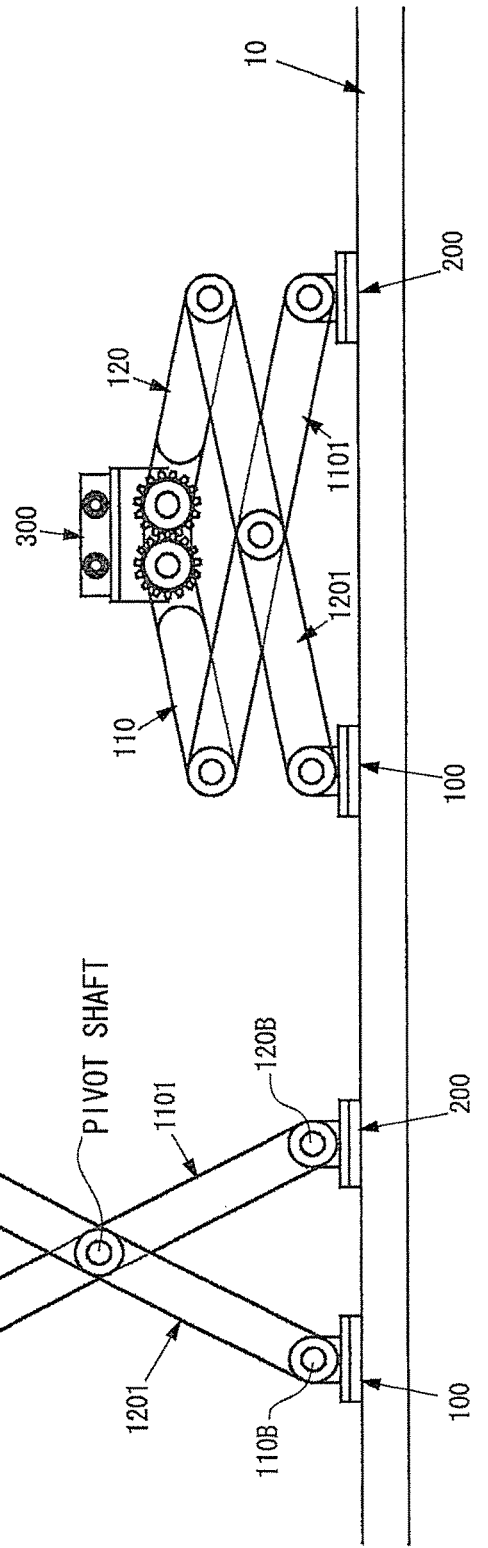
FIG. 2 is a front view for illustrating a configuration example of the workpiece conveying apparatus according to a modified example (having a pantograph shape) of the present invention.

There is a case where a large lifting dimension is required. In such a case, the number of arms may be increased, and, as illustrated in FIG. 2, arms 1101 and 1201 may be arranged in across shape (pantograph shape). Such a configuration may involve a large lifting amount to cope with the above-mentioned case.

Figure 3:
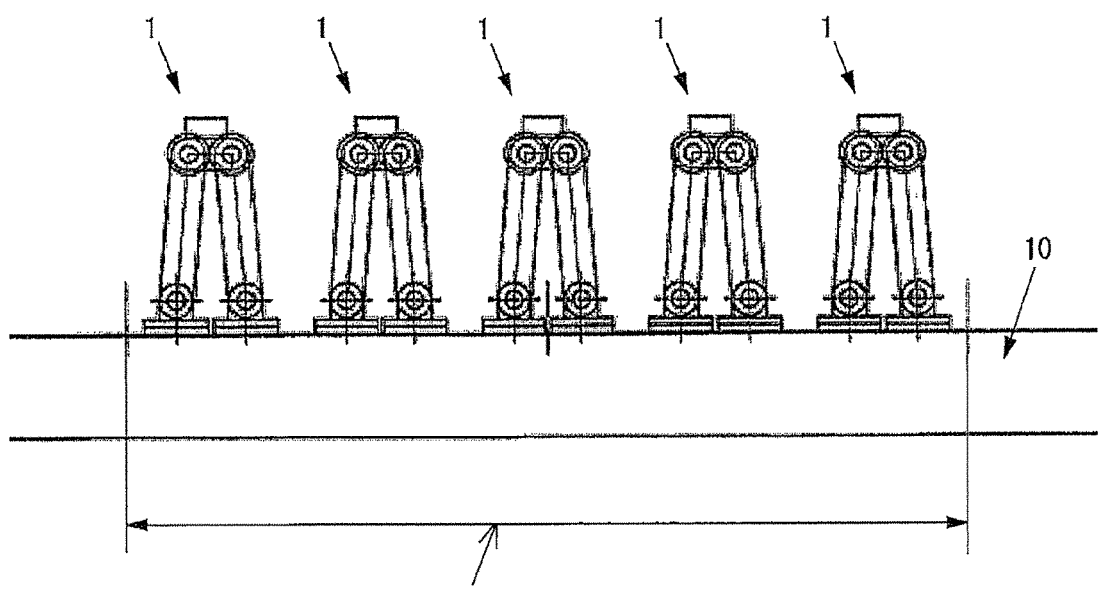
FIG. 3 is a front view for illustrating an example of a state in which a plurality of workpiece conveying apparatus are concentrated in the workpiece conveying direction.

Further, according to the workpiece conveying apparatus 1 of the first embodiment, during maintenance such as replacement of the suction cups, fingers, and the like, as illustrated in FIG. 3, the respective conveying tables 300 can be concentrated at a center portion or the like within a compact region. Accordingly, unnecessary movement and the like can be reduced during changeover work (or set-up) and the like. Consequently, the changeover work (or set-up) can be performed efficiently.

Incidentally, the related-art transfer apparatus simultaneously clamps workpieces (materials) in all steps by the feed bars and the fingers, and then conveys each of the workpieces from upstream to downstream. Accordingly, a feeding distance of the feed bars corresponds to a feeding pitch of all of the materials (interval between respective stages (respective dies)).

However, according to the workpiece conveying apparatus 1 of the first embodiment, all of feeding pitches of steps can be separately changed and adjusted.

Figure 4A:
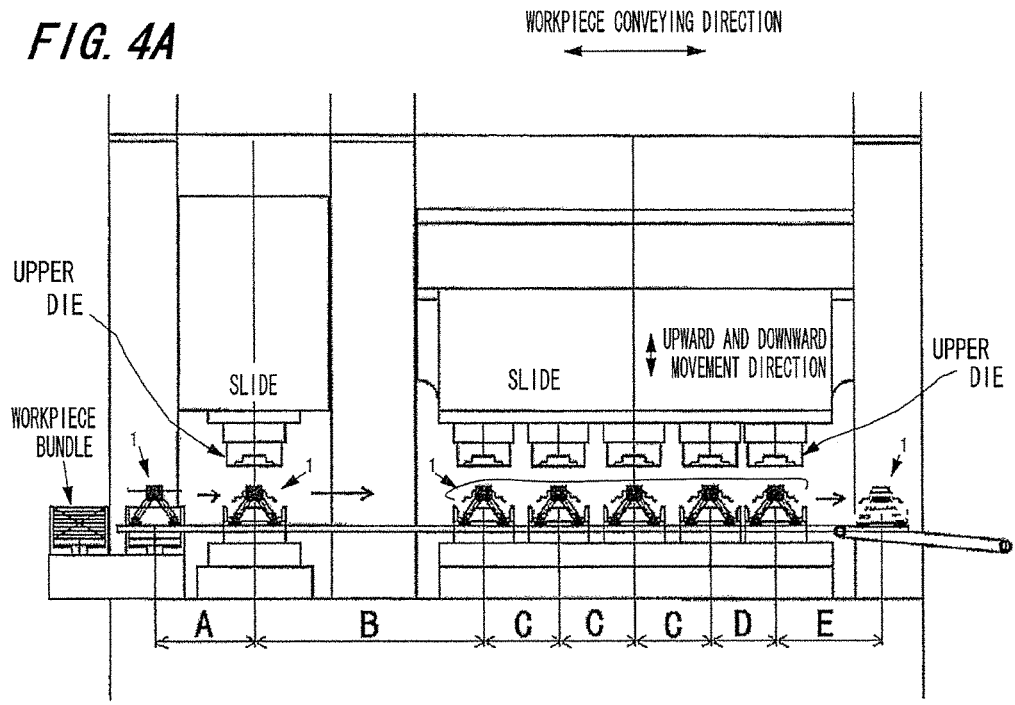
FIG. 4A is a front view for illustrating a configuration in which a plurality of dies are arranged between presses and on one slide of a transfer press at different feeding pitches in the workpiece conveying direction.
Figure 4B:
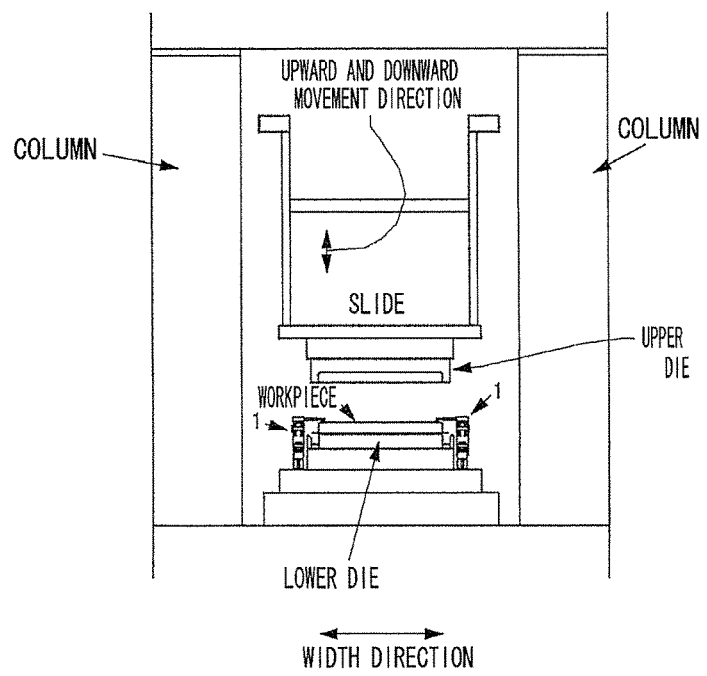
FIG. 4B is a right-hand side view of FIG. 4A.

Accordingly, as illustrated in FIG. 4A and FIG. 4B, for example, in addition to a dimension "A" between a material stocker and a first slide and a dimension "B" between the first slide and a second slide, die pitches "C" and "D" can be set to different pitches from step to step (different intervals between respective stages (respective dies)). Thus, step pitches can be designed with reference to, for example, strength of dies, thereby being capable of achieving a design and the like enabling a reduction in die cost.

As illustrated in FIG. 5A to FIG. 5C, in place of the suction cup, fingers configured to hold the workpiece may be mounted to the distal end of the clamping actuator 310.

Second Embodiment

Figure 22:
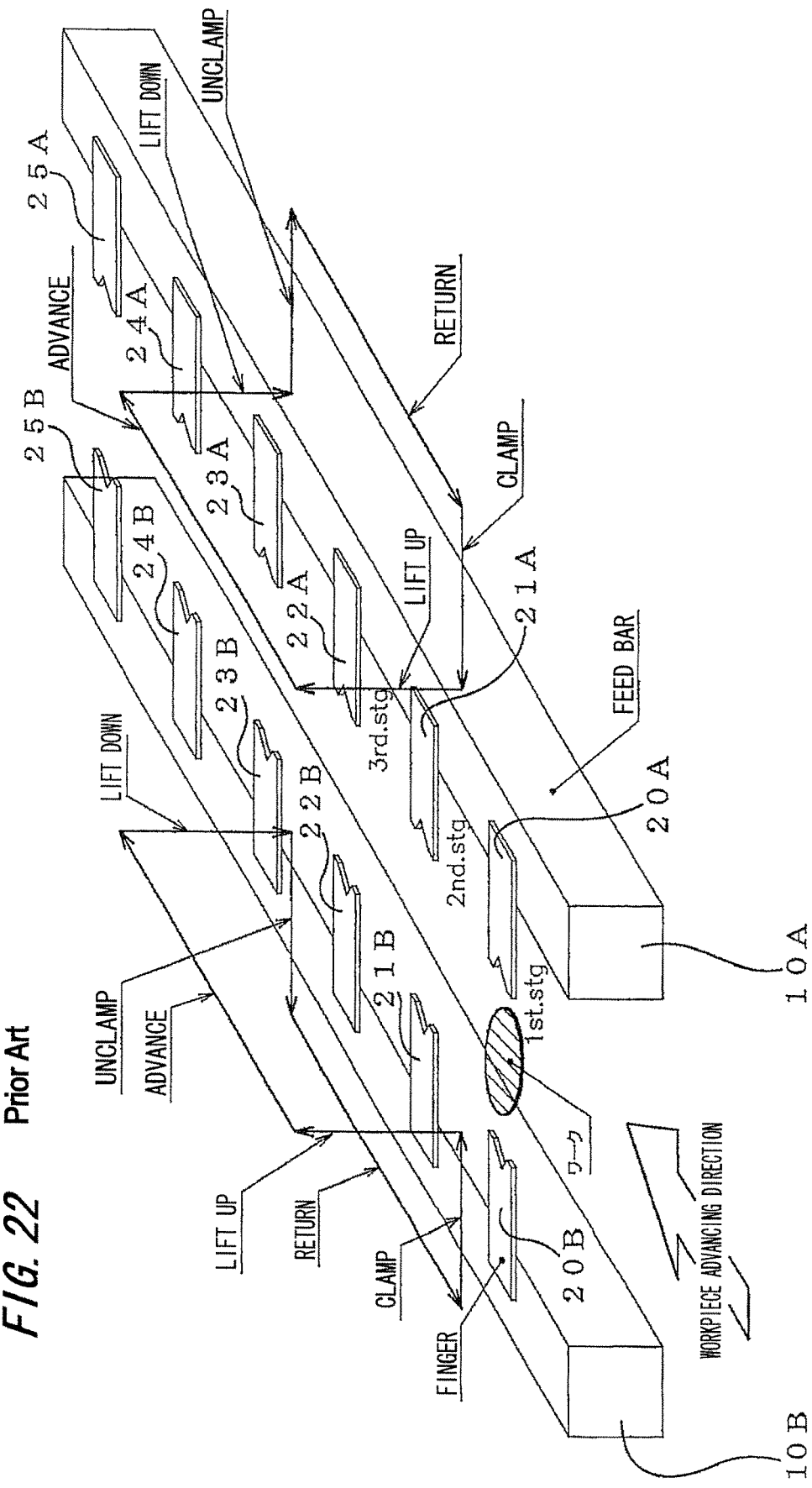
FIG. 22 is a perspective view for illustrating an example of a workpiece conveying apparatus (feed bar system) for a related-art pressing machine (transfer press) (view for illustrating operations).

In the related-art transfer apparatus, the pair of feed bars arranged in an opposed manner simultaneously clamps the workpieces (materials) in all steps, and then conveys each of the workpieces from the upstream to the downstream in the conveying direction (see FIG. 22, FIG. 23A, and the like). Accordingly, from the upstream to the downstream in the conveying direction, products are sequentially formed with dies aligned in the step order.

FIGS. 23A-23C shows the structure a general transfer-conveying apparatus. While materials are transfer-conveyed using fingers, suction cups, and the like mounted to feed bars arranged on the front and rear sides, processing having multiple steps is performed. Materials in multiple steps are nipped and conveyed by front and rear feed bars. A distance between right and left fulcrums of clamping and lifting of each feed bar is long. Thus, a characteristic frequency is low, and feed bars vibrate in a clamping direction and a lifting direction during a high-speed operation. Consequently, materials may slip off, or clamping position error may occur. As countermeasure for this, it is conceivable to prepare rigid feed bars, but inertia of feed bars is increased. Thus, increase in capacity of driving motor may be required.

Accordingly, from the upstream to the downstream, processes of drawing (first step), restriking (second step: maximum load), trimming (third step), piercing (fourth step), and piercing (fifth step) are performed in the stated order. A high load is applied during the upstream steps, whereas a low load is applied during the downstream steps. Accordingly, loads are different in the upstream steps and the downstream steps on one slide, with the result that forming is performed under an eccentric load.

Therefore, the loads applied to the slide, and deformation amounts of the slide are different between an upstream die and a downstream die (the slide is prone to deform obliquely). Thus, it is difficult to form the workpiece under an equal load between the upstream and the downstream. As a result, in actuality, this problem may lead to degradation in accuracy of a formed product, and may lead to a reduction in die lifetime because an excessive force is applied to the dies.

Further, in recent years, working of an ultra-high-tensile steel sheet is demanded, and along with an increase in processing load, an influence of working performed under an eccentric load further grows. However, in actuality, there is no method other than coping with this problem through, for example, renewal of a pressing machine.

That is, in the related-art transfer apparatus, the feed bars and the fingers simultaneously clamp the workpieces (materials) in all steps, and then convey the workpieces from the upstream to the downstream. Accordingly, the related-art transfer apparatus can perform only sequential feed forming (forming in which forming steps proceed from upstream to downstream). However, in the second embodiment, as illustrated in FIG. 6C, workpiece conveying apparatus 1 and 2 are arranged side by side in the width direction (direction substantially orthogonal to the workpiece conveying direction), and lifting heights are set so that the fingers, the actuators, and the like configured to clamp the workpiece cause no interference with the workpiece. Thus, without interference, the workpiece conveying apparatus 1 and the workpiece conveying apparatus 2 are movable in the workpiece conveying direction while passing each other. With this, the workpiece can be conveyed to an arbitrary step without being sequentially conveyed from the upstream to the downstream.

Figure 6A:
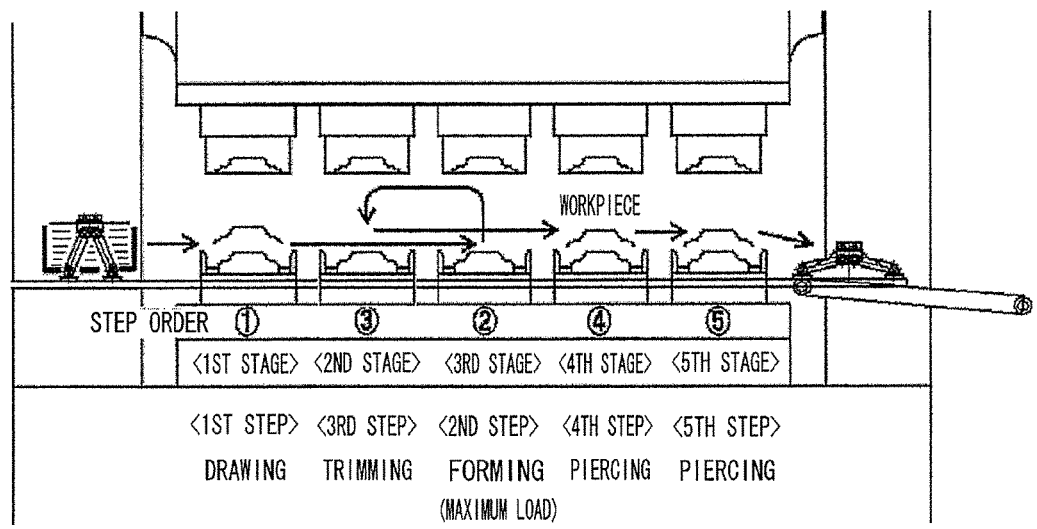
FIG. 6A is a front view for illustrating an example of a case of interchanging the order of working steps performed within one slide of a transfer press according to a second embodiment of the present invention.
Figure 6B:
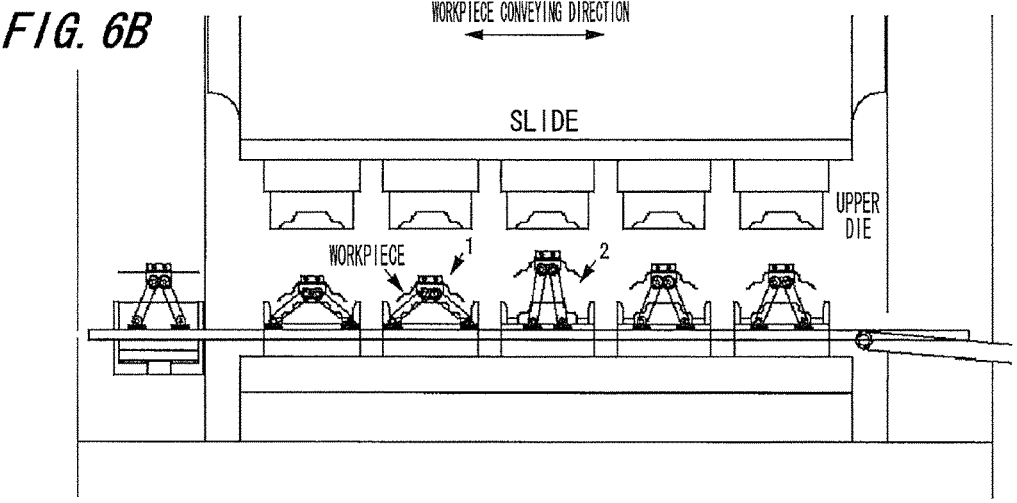
FIG. 6B is a front view for illustrating a lifting method different from the lifting method for the workpiece conveying apparatus adopted in FIG. 6A.
Figure 6C:
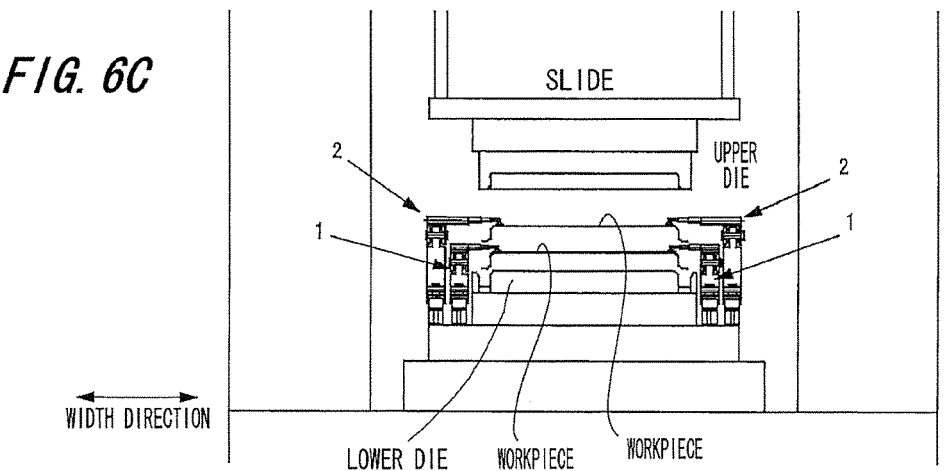
FIG. 6C is a right-hand side view of FIG. 6B (for illustrating a configuration example of the workpiece conveying apparatus that are movable in the workpiece conveying direction while passing each other).

As described above, when the workpiece can be conveyed to an arbitrary step, in a case where an eccentric load is applied to the slide as in the related art, as illustrated FIG. 6A and FIG. 6B, arrangement of the dies is modified so that a step under a maximum load is arranged at a center. In this arrangement, the workpiece is conveyed in the step order (first step (first stage), second step (third stage), third step (second stage), and so on in the stated order) so that forming that involves no eccentric load to the slide can be performed. Therefore, according to the workpiece conveying apparatus 1 of the second embodiment, the forming that involves no eccentric load to the slide can be performed. Accordingly, the workpiece conveying apparatus 1 can accelerate an increase in accuracy of a formed product, and can contribute to elongation of a die lifetime because application of the excessive force to the dies is attenuated.

Figure 7A:
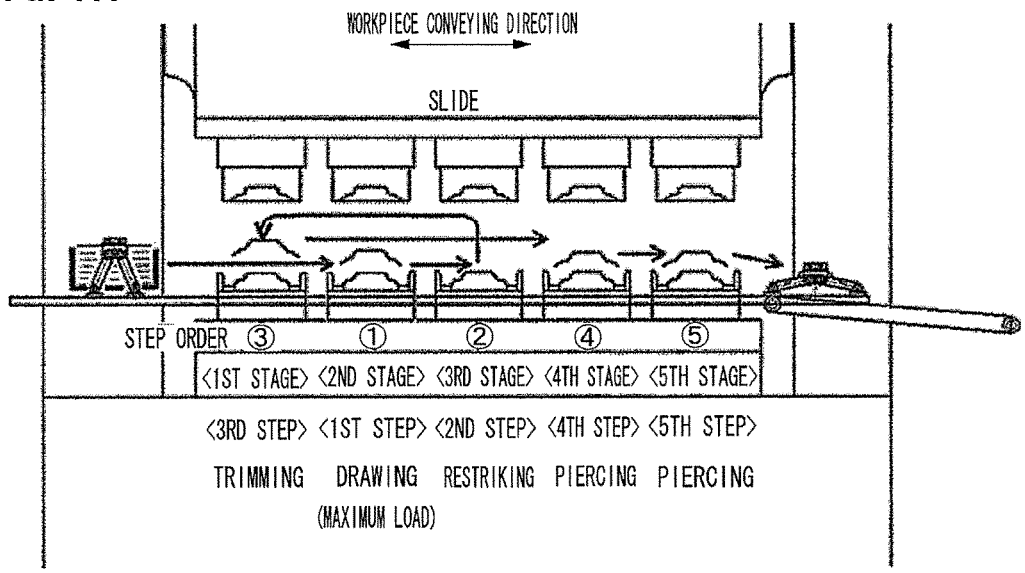
FIG. 7A is a front view for illustrating another example of the case of interchanging the order of working steps performed within one slide of the transfer press according to the second embodiment.
Figure 7B:
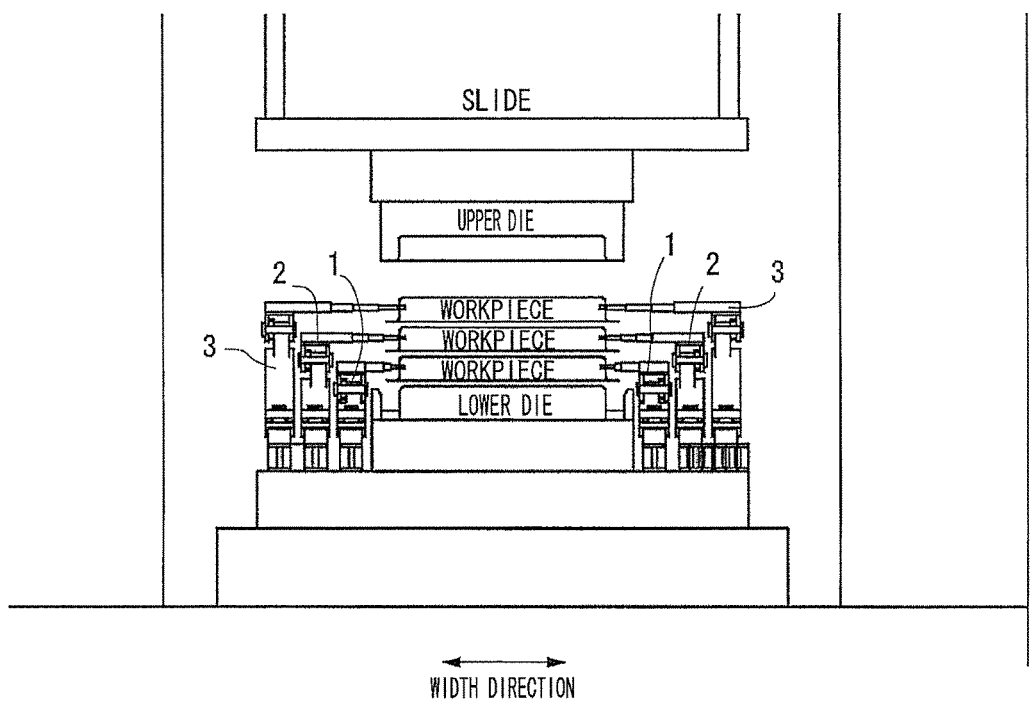
FIG. 7B is a right-hand side view of FIG. 7A (for illustrating a configuration example of the workpiece conveying apparatus that are movable in the workpiece conveying direction while passing each other).

Further, as illustrated in FIG. 7B, workpiece conveying apparatus 1, 2, and 3 may be arranged in three lines in the width direction, and the step order (appropriate step order) illustrated in FIG. 7A may be adopted.

Figure 17:
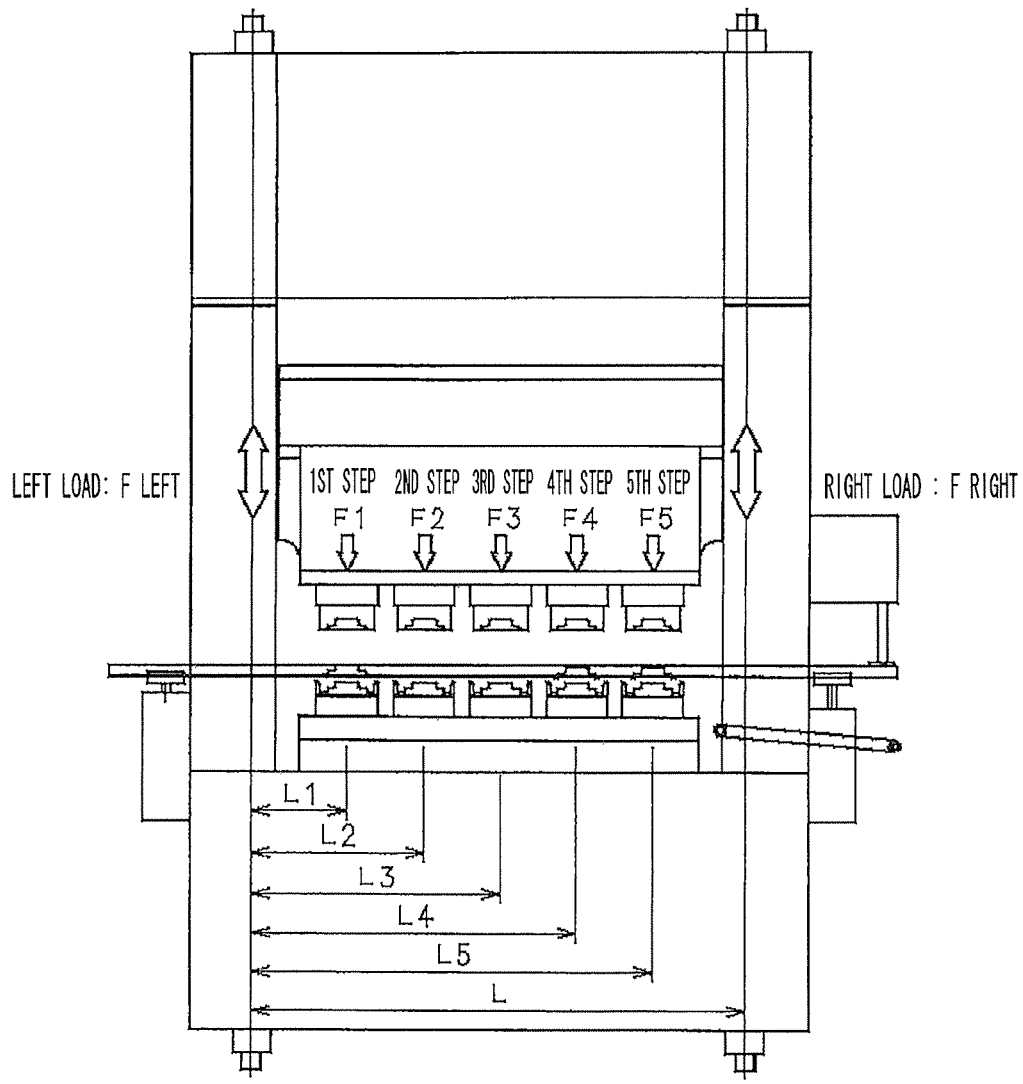
FIG. 17 is a view for illustrating a calculation method of FIG. 16.

In FIG. 16, there are shown calculation results of a comparison between an eccentric load ratio of first to fifth steps in related-art transfer working (processing method in which working steps sequentially proceed from the upstream to the downstream), and an eccentric load ratio of first to fifth steps in transfer working according to this embodiment (processing method in which the order of working steps is interchanged to reduce an eccentric load) (see FIG. 17 for mathematical expressions and the like).

As shown in FIG. 16, it has been found that the ratio of the eccentric load applied to the slide can be reduced to about a half of the eccentric load ratio of the related art when the order of working steps is interchanged. Accordingly, an increase in accuracy of a formed product and contribution to elongation of a die lifetime can be expected.

It is noted that a high-tensile steel sheet having higher strength is developed, and press forming copes with the high-tensile steel sheet. Under this circumstance, processing loads during drawing, restriking, and the like may be increased, thereby generating a large eccentric load. Thus, influences on product accuracy and die lifetime may be regarded as problems. Further, an eccentric load exceeding an eccentric load capacity of a pressing machine may cause stop of press forming, or forcible formation may cause failure, to cause stop of production. Accordingly, formation using existing press may be difficult. Thus, a pressing machine excellent in bearing an eccentric load may newly be prepared, or press to be used only for drawing may be added for a step preceding to a step performed by an existing press, thereby coping with the eccentric load. As shown in FIG. 16, when the order of steps is interchanged, an eccentric load ratio can be substantially halved, that is, reduced from 35% to 17%.

Third Embodiment

In a third embodiment of the present invention, as illustrated in FIG. 8A to FIG. 8C, any one of the gears 111 and 121 (for example, the gear 121 (equalizing gear b) on the arm 120 (arm b) side), which is pivotable about the upper pivot shaft (or axis) 110A or 120A and fixed to the arm 110 or 120, is configured to be rotatable relative to the arm 120 (arm b) about the upper pivot shaft (or axis) 120A (about a rotation center of the gear 121 (equalizing gear b)) by a servomotor 210, and to be capable of stopping or remaining at a predetermined rotation angle position. Any one of the gears 111 and 121 is rotated by the preset rotation angle, thereby being capable of inclining (leaning or tilting) the workpiece (material) as illustrated in FIG. 8A and FIG. 9. As shown in FIG. 8A, equalizing gear b and arm a can be arranged so as to be freely turnable about an upper fulcrum, and a rotation angle can arbitrarily be set by a servomotor. Thus, the angle of a conveying table can be varied into an arbitrary tilt angle. Equalizing gear a and arm a can be fastened to each other.

Further, when the workpiece is lifted down, the workpiece is not lowered vertically, but can be lowered in an arbitrary manner in each step, for example, obliquely in accordance with an orientation of the die. Accordingly, in a piercing step or the like, the workpiece (material) can be lowered to be brought into a state of being inclined at an arbitrary angle (FIG. 8B and FIG. 8C), and then set on the die (lower die).

Thus, there can be avoided such a situation in which an arrival angle of a punch is oblique to a surface of the workpiece (see FIG. 10A) when the workpiece (material) is lowered with horizontal balance as in the related art. Further, the punch can be vertically pressed into the surface of the workpiece (see FIG. 10B). Accordingly, the above-mentioned configuration can contribute to an increase in processing accuracy and an appearance of a cross-section of a formed hole, and can achieve production capable of increasing a punch lifetime because bending moment is not applied to the punch.

A mechanism enabling the conveying table 300 to be rotated by the servomotor 210 relative to the arm 120 (arm b) and enabling the conveying table 300 to stop or remain at the predetermined rotation angle position so as to incline (lean or tilt) the workpiece (material) corresponds to an example of the posture control unit according to the present invention.

That is, in this case, an angle between the conveying table 300 and the second arm 120 (or the first arm 110) is controlled through rotation control of the servomotor 210, thereby controlling the posture of the conveying table.

Fourth Embodiment

Figures 12A, 12B, 12C:
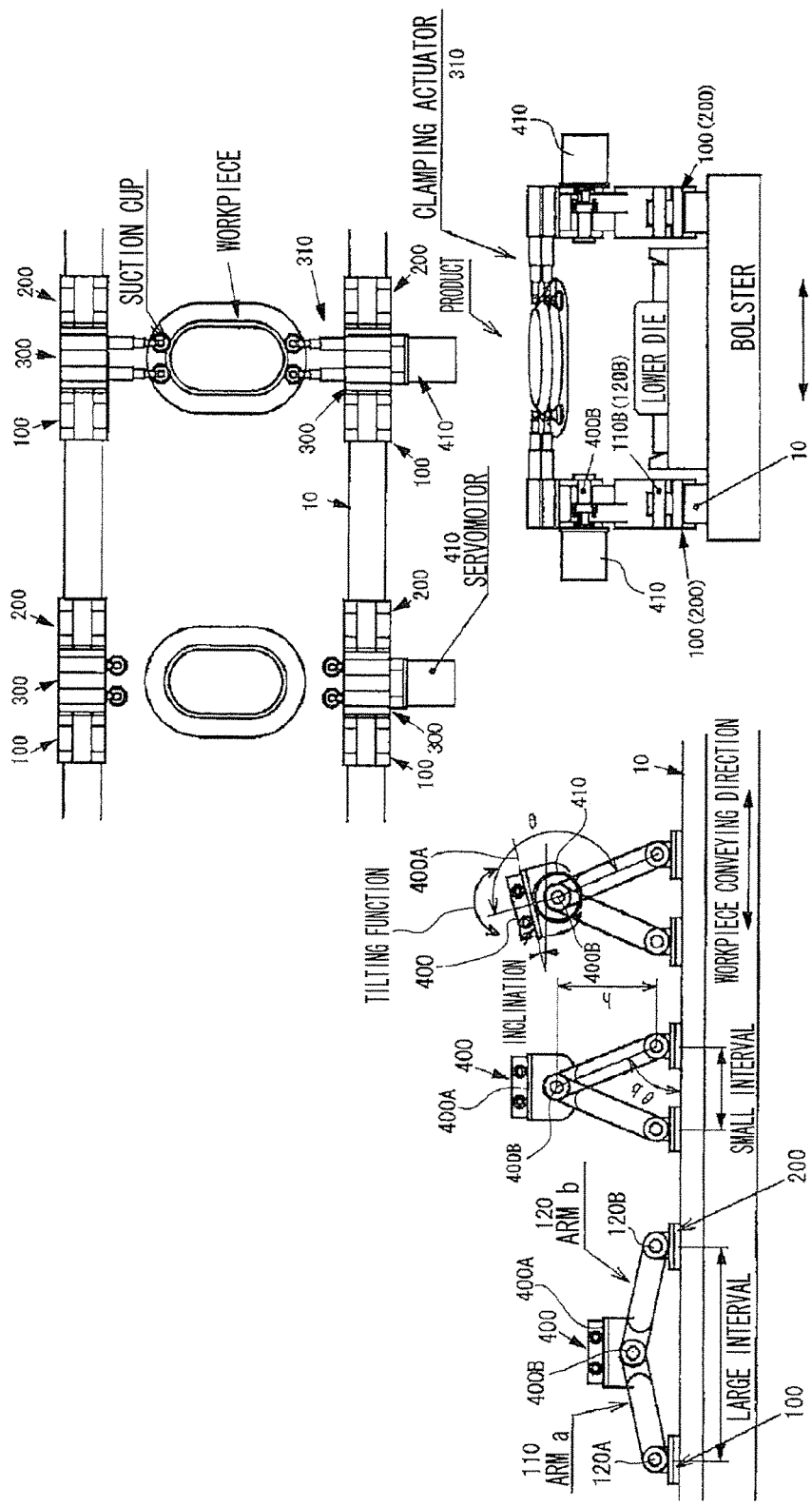
FIG. 12A is a front view for illustrating an overall configuration of a workpiece conveying apparatus according to a fourth embodiment of the present invention (as viewed from the horizontal direction orthogonal to the workpiece conveying direction).
FIG. 12B is a partial plan view of FIG. 12A.
FIG. 12C is a right-hand side view (sectional view) of FIG. 12A.

Fourth Embodiment (FIG. 12A to FIG. 12C)

In the first embodiment, as illustrated in FIG. 1A, the upper pivot shafts (or axises) 110A and 120A of the two arms 110 and 120, which are supported on the two linear motor tables 100 and 200 so as to be rotatable about the lower pivot shafts (or axises) 110B and 120B, are arranged substantially in parallel to the flat surface 300A of the conveying table 300. Further, the conveying table 300 is used as one link. In a fourth embodiment of the present invention, as illustrated in FIG. 12A to FIG. 12C, the upper pivot shafts (or axises) of the two arms 110 and 120 are modified into a single common pivot shaft (or axis) 400B, and the pivot shaft (or axis) 400B supports a conveying table 400.

Further, in the fourth embodiment, a servomotor 410 is stationarily fixed to the conveying table 400, and an output shaft (or axis) of the servomotor 410 and the arm 120 (arm b) are coupled substantially integrally with each other. Further, the servomotor 410 can rotate the arm 120 (arm b) relative to the conveying table 400 about the pivot shaft (or axis) 400B, and the arm 120 can stop or remain at the predetermined rotation angle position.

As illustrated in FIG. 12A, a pivot shaft (or axis) height h of the conveying table 400 is determined by relative positions (interval) of the two linear motor tables 100 and 200 driven independently of each other.

Further, while an angle θb of the arm 120 (arm b) at an arbitrary pivot shaft (or axis) height h is calculated, the servomotor 410 always performs control so as to keep a flat surface 400A of the conveying table 400 substantially horizontal or forming a predetermined tilt angle θ.

A mechanism enabling the conveying table 300 to be rotated by the servomotor 410 relative to the arm 120 (arm b) and enabling the conveying table 300 to stop or remain at the predetermined rotation angle position so as to incline (lean or tilt) the workpiece (material) corresponds to an example of the posture control unit according to the present invention.

That is, in this case, an angle between the conveying table 300 and the second arm 120 (or the first arm 110) is controlled through rotation control of the servomotor 410, thereby controlling the posture of the conveying table.

It is noted that, as shown in FIG. 12A, arm b and a servomotor shaft can be fixed to each other. A servomotor flange and a conveying table can also be fixed to each other. Fulcrum height h of the conveying table can be determined based on positions of two linear motors. Further, while angle θb of arm b at arbitrary height h is calculated, a tilting servomotor can control angle θ of the conveying table. An angle formed by arm b and the surface of the conveying table may be controlled by the servomotor.

Also with the configuration according to the fourth embodiment, the same and various operations and effects as those of the above-mentioned first embodiment can be obtained.

Fifth Embodiment

Fifth Embodiment (FIG. 13A to FIG. 13C)

In the above-mentioned fourth embodiment, there is exemplified a mode in which the servomotor 410 is stationarily fixed to the conveying table 400. In a fifth embodiment of the present invention, as illustrated in FIG. 13A to FIG. 13C, in place of the servomotor 410, a servomotor 510 is mounted to the linear motor table 200 (or 100), and an output rotation shaft of the servomotor 510 and the arm 120 (arm b) are coupled to each other in a rotatable manner. Further, the servomotor 510 is rotatable about the lower pivot shaft (or axis) 120B independently of the arm 120 (arm b).

Similarly to the fourth embodiment, as illustrated in FIG. 13A, the pivot shaft (or axis) height h of the conveying table 400 is determined by the relative positions (interval) of the two linear motor tables 100 and 200 driven independently of each other.

However, in the above-mentioned configuration, a position of the conveying table 400 about the pivot shaft (or axis) 400B (angular position of the flat surface 400A about the pivot shaft (or axis) 400B) is not fixed. Thus, in the fifth embodiment, there are arranged a pulley 511 substantially integrated with the conveying table 400 so as to be rotatable about the pivot shaft (or axis) 400B, and a pulley 512 rotating substantially integrally with the output shaft of the servomotor 510. A belt 513 is stretched around the pulley 511 and the pulley 512.

Therefore, when the above-mentioned servomotor 510 is rotated by a predetermined rotation angle, the pulley 511 is rotated through the pulley 512 and the belt 513 by the predetermined rotation angle. Thus, the conveying table 400 substantially integrated with the pulley 511 is rotated about the pivot shaft (or axis) 400B.

That is, similarly to the fourth embodiment, while the angle θb of the arm 120 (arm b) is calculated, the servomotor 510 can always perform control so as to keep the flat surface 400A of the conveying table 400 substantially horizontal or forming a predetermined tilt angle θ. The servomotor 510 is rotatable, and is capable of stopping or remaining at the predetermined rotation angle position.

In this case, a mechanism of always performing control using the servomotor 510, the pulley 511, the pulley 512, and the belt 513 so as to keep the flat surface 400A of the conveying table 400 substantially horizontal or forming the predetermined tilt angle θ corresponds to an example of the posture control unit according to the present invention.

That is, in this case, an angle between the conveying table 300 and the second arm 120 (or the first arm 110) is controlled through rotation control of the servomotor 510, thereby controlling the posture of the conveying table.

It is noted that, as shown in FIG. 13A, a pulley connected to a servomotor fixed to a linear servomotor table, and a pulley fixed to a conveying table can be synchronized by a belt. Thus, the angle of the conveying table can be controlled by the servomotor.

Also with the configuration according to the fifth embodiment, the same and various operations and effects as those of the above-mentioned first embodiment can be obtained.

Sixth Embodiment

Sixth Embodiment (FIG. 14A and FIG. 14B)

In the first embodiment to the fifth embodiment described above, the conveying table 300 (400) is supported by the two arms 110 and 120 that are supported on the two linear motor tables 100 and 200 so as to be rotatable about the lower pivot shafts (or axises) 110B and 120B. In a sixth embodiment of the present invention, as illustrated in FIG. 14A and FIG. 14B, in place of the two linear motor tables 100 and 200, two tables 1000 and 2000 can be moved by ball screws 600 driven by servomotors 610 and 611. The table 1000 corresponds to the first moving unit according to the present invention, and the table 2000 corresponds to the second moving unit according to the present invention. It is noted that conveyance in all steps can be performed by two servomotors. This system can be configured irrespective of any drive source, such as a linear motor, a screw linear drive, or a belt-driven linear drive.

While the two tables 1000 and 2000, on which the two arms 110 and 120 are supported so as to be rotatable about the lower pivot shafts (or axises) 110B and 120B, are linearly moved and guided along linear guide rails (LM guide rails), the two tables 1000 and 2000 can be moved in a longitudinal direction of shafts 620 and 621 by the ball screws 600 engaged with threaded outer peripheries of the shafts 620 and 621.

Other components may be the same as those according to the first embodiment to the fifth embodiment.

The mechanism of moving the two tables, on which the two arms 110 and 120 are supported so as to be rotatable, is not limited to a mechanism of driving the two tables by linear motors. A case of moving the two tables using a ball screw mechanism as described in the sixth embodiment (corresponding to an example of the moving mechanism according to the present invention), and a case of moving the two tables using a gear mechanism, belt driving, or the like may be also adopted.

However, when the above-mentioned mechanisms are adopted, as compared to a case of adopting linear motors, a degree of freedom in movement of the two tables is determined based on the number of drive sources and complexity of a mechanism. Accordingly, for example, when the pair of tables 1000 and 2000 is moved by the two shafts 620 and 621 to which rotational forces are transmitted from the two servomotors 610 and 611 as illustrated in FIG. 15A and FIG. 15B (when the workpiece is lifted), a degree of freedom in movement of the two tables 1000 and 2000 is low as compared to a case of adopting linear motors. However, the case of using the two shafts 620 and 621 can contribute to a reduction in cost, simplification and facilitation of the configuration and drive control, enhancement of reliability of drive control, and the like.

Also with the configuration according to the sixth embodiment, the same operations and effects as those of the above-mentioned first embodiment can be obtained. That is, the related-art feed bars having large sizes and large weights can be omitted, thereby being capable of omitting a large-volume actuator configured to move the feed bars and the like. Therefore, the lightweight and compact configuration can be achieved relatively easily at low cost. Thus, the lightweight and compact configuration can increase a degree of freedom in the posture of the workpiece during workpiece conveyance while reducing vibration noise, and can contribute to an increase in conveying speed of the workpiece, a reduction in cycle time period, an increase in production efficiency, and the like.

Seventh Embodiment

Now, a lifting force (lifting mass) of the workpiece conveying apparatus 1 according to the first embodiment is considered.

The linear motor tables 100 and 200 can stop or remain at predetermined positions so as to be capable of overcoming loads through drive control. As illustrated in FIG. 18, when linear thrust forces F1 are generated, a lifting force F2 is obtained.

Under a state in which the angle θ of the arm 120 about the lower pivot shaft (or axis) 120B is near 0 degrees (under a state in which the arm 120 is substantially horizontal), even when the linear motor tables 100 and 200 generate the linear thrust forces, the arms 110 and 120 are horizontal and opposed to each other, with the result that the linear motor tables 100 and 200 are brought into an uncontrollable state of being immovable in mutually approaching directions. Thus, there is a fear in that a lifting force of lifting up the conveying table 300 cannot be generated.

Accordingly, as illustrated in FIG. 19, in the seventh embodiment, there is arranged a lying-down preventing roller 112 configured to restrain downward movement of the arms 110 and 120 immediately before the arms 110 and 120 are brought into a horizontal state.

With this configuration, for example, during a power-off state, the arms 110 and 120 can be reliably prevented from being brought into a horizontal state to be uncontrollable.

It is noted that regarding lifting mass calculation, when angle θ is near 0 degree, lifting force cannot be generated irrespective of thrust force of a linear motor. Accordingly, a mechanical block or the like is needed to prevent angle θ from being equal to or lower than set angle. Alternatively, there is needed structure enabling linear motor with brake to keep set angle θ even during power-off state. See FIG. 19.

Eighth Embodiment

As illustrated in FIG. 20A to FIG. 20C, in an eighth embodiment of the present invention, the gears 111 and 121 according to the first embodiment are omitted, and springs 113 and 123 are adopted.

One end of the spring (power spring) 113 formed of a coiled spring material is fixed to the arm 110, and another end thereof is fixed to the conveying table 300. The spring 113 is arranged so as to allow the arm 110 to be rotated about the upper pivot shaft (or axis) 110A, and so as to elastically urge the arm 110 in a direction of bringing the arm 110 into a substantially upright state (direction of moving the arm 110 so that the angle θ of the arm 110 about the lower pivot shaft (or axis) 110B forms 90 degrees).

Similarly, one end of the spring (power spring) 123 is fixed to the arm 120, and another end thereof is fixed to the conveying table 300. The spring 123 is arranged so as to allow the arm 120 to be rotated about the upper pivot shaft (or axis) 120A, and so as to elastically urge the arm 120 in a direction of bringing the arm 120 into a substantially upright state (direction of moving the arm 120 so that the angle θ of the arm 120 about the lower pivot shaft (or axis) 120B forms 90 degrees).

In this case, the springs 113 and 123 correspond to an example of the posture control unit according to the present invention.

That is, in this case, the angle between the conveying table 300 and the second arm 120 (or the first arm 110) is controlled by the springs 113 and 123, thereby controlling the posture of the conveying table.

In this case, as illustrated in FIG. 20A to FIG. 20C, a lifting force of lifting up the conveying table 300 is a resultant force of the lifting force F2 generated when the linear motor tables 100 and 200 generate the linear thrust forces F1, and of a lifting force F3 resulting from elastic forces of the springs 113 and 123.

When the springs 113 and 123 are adopted, even in a case where power is rotated off to cause the linear thrust forces of the linear motor tables 100 and 200 to be lost, the springs 113 and 123 are returned to original states (FIG. 20A) owing to restoring forces thereof. Thus, the arms 110 and 120 can be reliably prevented from being horizontal and uncontrollable.

As illustrated in FIG. 20C, the springs 113 and 123 may be used in combination with equalizing gears (gears 111 and 121).

It is noted that spring force may be set to be capable of lifting mass of a clamping unit and mass of product. Thus, even when angle θA is 0 degrees, product can be lifted in synchronization with a linear motor. Further, spring force functions as balancer, thereby obtaining effect of reducing power consumption.

In addition, similarly to the third embodiment, that is, similarly to the configuration illustrated in FIG. 8A to FIG. 8C, one of the gears 111 and 121 (for example, the gear 121) may be configured to be rotatable relative to the arm 120 about the upper pivot shaft (or axis) 120A (about the rotation center of the gear 121) by the servomotor, and to be capable of stopping or remaining at the predetermined rotation angle position. Any one of the gears 111 and 121 may be configured to be capable of, by being rotated by the preset rotation angle, inclining (leaning) the workpiece (material) at an arbitrary angle as illustrated in FIG. 8A and FIG. 9.

Incidentally, in the above-mentioned embodiments, as illustrated in FIG. 21, the interval between the tables 100 and 200 of one workpiece conveying apparatus 1, and the interval between the tables 100 and 200 of another workpiece conveying apparatus 1 can be easily varied from each other through drive control of linear motors (or the servomotors and the ball screw mechanisms according to the sixth embodiment). The one workpiece conveying apparatus 1 and the another workpiece conveying apparatus 1 are arranged across the lower die in a direction substantially orthogonal to the workpiece conveying direction. Accordingly, using this, for example, heights of the conveying tables 300 are varied between the two workpiece conveying apparatus 1 arranged across the same lower die in an opposed manner. This configuration can easily cope with a case where heights of supporting the workpiece are not laterally symmetrical in the width direction, for example, a case where the supporting heights are different from each other.

Further, in the above-mentioned embodiments, even in a case where positions (positions in the workpiece conveying direction) of supporting the workpiece are different between the two workpiece conveying apparatus 1 arranged across the same lower die in an opposed manner, positions of the two workpiece conveying apparatus 1 can be easily varied through drive control of linear motors (or the servomotors and the ball screw mechanism according to the sixth embodiment), thereby being capable of easily coping with the above-mentioned case.

Incidentally, in the above-mentioned embodiments, the angle between the conveying table and the second arm is controlled by the servomotor or the like, thereby controlling the posture of the conveying table. However, when the conveying table is used as one link of a link mechanism as in the first embodiment, the posture of the conveying table can be also controlled through control, by the servomotor, of an angle between the first arm (arm 110) and the first moving unit (linear motor table 100), or an angle between the second arm (arm 120) and the second moving unit (linear motor table 200). The present invention also encompasses this configuration.

The embodiments described above are merely examples for describing the present invention, and various modifications may be made without departing from the gist of the present invention.

What is claimed is:

1. A workpiece conveying apparatus for a pressing machine, comprising:
   a conveying table comprising a workpiece supporting mechanism configured to support a workpiece in a releasable manner, the conveying table having a first pivot axis and a second pivot axis;
   a first arm and a second arm each having one end attached to the conveying table so as to be pivotable about the first pivot axis and the second pivot axis, respectively;
   a first moving unit to which another end of the first arm is coupled;
   a second moving unit to which another end of the second arm is coupled; and
   a posture control unit configured to control a posture of the conveying table through control of at least one of an angle between the conveying table and one of the first arm and the second arm, an angle between the first arm and a movable direction of the first moving unit, and an angle between the second arm and a movable direction of the second moving unit,
   wherein the first moving unit and the second moving unit are movable by a moving mechanism in the workpiece conveying direction,
   wherein the conveying table is lifted up and down through a change of an interval between the first moving unit and the second moving unit,
   wherein the first moving unit and the second moving unit are moved in the same workpiece conveying direction so as to move the conveying table in the workpiece conveying direction, to thereby convey the workpiece,
   wherein the posture control unit comprises:
      a first gear integrally fixed to the one end of the first arm so as to be pivotable together with the first arm about the first pivot axis; and
      a second gear, which is meshed with the first gear, integrally fixed to the one end of the second arm so as to be pivotable together with the second arm about the second pivot axis, and
   wherein the one end of the first arm and the first gear are attached together to the conveying table through the first pivot axis about which the first arm and the first gear are pivotable together, and the one end of the second arm and the second gear are attached together to the conveying table through the second pivot axis about which the second arm and the second gear are pivotable together.

2. The workpiece conveying apparatus for a pressing machine according to claim 1, further comprising a plurality of workpiece conveying apparatuses including the workpiece conveying apparatus,
   wherein the plurality of workpiece conveying apparatuses are arranged in the workpiece conveying direction, and
   wherein the plurality of workpiece conveying apparatuses are configured to prevent mutual interference, and to be movable along the workpiece conveying direction while passing each other.

3. The workpiece conveying apparatus for a pressing machine according to claim 1, wherein the moving mechanism comprises a linear motor.

4. A workpiece conveying apparatus for a pressing machine, comprising:
   a conveying table comprising a workpiece supporting mechanism configured to support a workpiece in a releasable manner, the conveying table having a first pivot axis and a second pivot axis;
   a first arm and a second arm each having one end attached to the conveying table through the first pivot axis and the second pivot axis so as to be pivotable about the first pivot axis and the second pivot axis, respectively;
   a first moving unit to which another end of the first arm is coupled;
   a second moving unit to which another end of the second arm is coupled; and a posture control unit configured to control a posture of the conveying table through control of at least one of an angle between the conveying table and one of the first arm and the second arm, an angle between the first arm and a movable direction of the first moving unit, and an angle between the second arm and a movable direction of the second moving unit, wherein the first moving unit and the second moving unit are movable by a moving mechanism in the workpiece conveying direction, wherein the conveying table is lifted up and down through a change of an interval between the first moving unit and the second moving unit, wherein the first moving unit and the second moving unit are moved in the same workpiece conveying direction so as to move the conveying table in the workpiece conveying direction, to thereby convey the workpiece, wherein the first pivot axis couples the conveying table and the first arm to each other, and the second pivot axis couples the conveying table and the second arm to each other, wherein the posture control unit comprises:
a first gear supported so as to be pivotable about the first pivot axis coupling the conveying table and the first arm to each other; and
a second gear, which is meshed with the first gear, supported so as to be pivotable about the second pivot axis coupling the conveying table and the second arm to each other, and wherein (1) the first gear is fixed to the first arm to pivot together, (2) the second gear is fixed to the second arm to pivot together, or (3) the first gear is fixed to the first arm to pivot together and the second gear is fixed to the second arm to pivot together.

* * * * *